United States Patent
Hamamura et al.

(10) Patent No.: US 12,257,863 B2
(45) Date of Patent: Mar. 25, 2025

(54) PNEUMATIC TIRE

(71) Applicant: Sumitomo Rubber Industries, Ltd., Kobe (JP)

(72) Inventors: Kenji Hamamura, Kobe (JP); Hiroki Kawai, Kobe (JP); Subaru Toya, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 28 days.

(21) Appl. No.: 18/018,103

(22) PCT Filed: Jul. 26, 2021

(86) PCT No.: PCT/JP2021/027586
§ 371 (c)(1),
(2) Date: Jan. 26, 2023

(87) PCT Pub. No.: WO2022/030285
PCT Pub. Date: Feb. 10, 2022

(65) Prior Publication Data
US 2023/0286330 A1    Sep. 14, 2023

(30) Foreign Application Priority Data

Aug. 4, 2020   (JP) ................................. 2020-132411

(51) Int. Cl.
*B60C 3/04*    (2006.01)
*B60C 1/00*    (2006.01)
(Continued)

(52) U.S. Cl.
CPC ............ *B60C 13/00* (2013.01); *B60C 1/0025* (2013.01); *B60C 3/04* (2013.01);
(Continued)

(58) Field of Classification Search
CPC .............................................. B60C 2013/007
See application file for complete search history.

(56) References Cited

U.S. PATENT DOCUMENTS

| 8,530,575 B2 | 9/2013 | Miyazaki |
| 2003/0141000 A1 | 7/2003 | Serra et al. |

(Continued)

FOREIGN PATENT DOCUMENTS

| CN | 109627509 A | 4/2019 |
| EP | 2 154 006 A1 | 2/2010 |

(Continued)

OTHER PUBLICATIONS

International Search Report, issued in PCT/JP2021/027586, PCT/ISA/210, dated Sep. 28, 2021.
(Continued)

*Primary Examiner* — Kendra Ly
(74) *Attorney, Agent, or Firm* — Birch, Stewart, Kolasch & Birch, LLP (57) ABSTRACT

Provided is a pneumatic tire that has reduced rolling resistance during high-speed running as well as excellent durability performance. This pneumatic tire comprises a sidewall and a clinch section in each of a pair of side sections. When the loss tangent of the sidewall is tan δsw and the loss tangent of the clinch section is tan δc when measured under the conditions of 70° C., a frequency of 10 Hz, an initial strain of 5%, and a dynamic strain rate of 1%, then (tan δsw+tan δc)≤0.3 and |tan δsw−tan δc|≤0.07. When the cross-sectional width of the tire is Wt (mm) and the external diameter is Dt (mm) when the pneumatic tire is installed on a standardized rim and internal pressure is set to 250 kPa, and if the volume of space occupied by the tire is a virtual volume V (mm³), then (formula 1) and (formula 2) are satisfied.

(Continued)

$$1700 \leq (Dt^2 \times \pi/4)/Wt \leq 2827.4 \quad \text{(formula 1)}$$

$$[(V+1.5\times 10^7)/Wt] \leq 2.88\times 10^5 \quad \text{(formula 2)}.$$

17 Claims, 1 Drawing Sheet

(51) Int. Cl.
  *B60C 13/00* (2006.01)
  *B60C 15/06* (2006.01)
(52) U.S. Cl.
  CPC .. *B60C 2001/005* (2013.01); *B60C 2013/006* (2013.01); *B60C 2013/007* (2013.01); *B60C 2015/0614* (2013.01)

(56) References Cited

U.S. PATENT DOCUMENTS

| | | | | |
|---|---|---|---|---|
| 2010/0032071 | A1* | 2/2010 | Miyazaki | C08L 9/00 152/525 |
| 2013/0213545 | A1* | 8/2013 | Tanaka | B60C 13/02 152/454 |
| 2014/0138003 | A1* | 5/2014 | Kuwayama | B60C 3/04 152/454 |
| 2016/0152076 | A1 | 6/2016 | Asano et al. | |
| 2017/0028788 | A1 | 2/2017 | Kuwayama et al. | |
| 2017/0297383 | A1 | 10/2017 | Hatanaka et al. | |
| 2017/0305192 | A1 | 10/2017 | Yokoyama et al. | |
| 2018/0122688 | A1 | 5/2018 | Bedell et al. | |
| 2020/0032037 | A1 | 1/2020 | Takano et al. | |
| 2020/0247193 | A1 | 8/2020 | Nakajima et al. | |

FOREIGN PATENT DOCUMENTS

| | | |
|---|---|---|
| JP | 2003-522669 A | 7/2003 |
| JP | 2008-273519 A | 11/2008 |
| JP | 2010-58782 A | 3/2010 |
| JP | 2013-221052 A | 10/2013 |
| JP | 2014-213821 A | 11/2014 |
| JP | 2015-30428 A | 2/2015 |
| JP | 2015-189253 A | 11/2015 |
| JP | 2016-74283 A | 5/2016 |
| JP | 2016-74298 A | 5/2016 |
| JP | 2016-74408 A | 5/2016 |
| JP | 2017-24562 A | 2/2017 |
| JP | 2018-178034 A | 11/2018 |
| JP | 2019-89911 A | 6/2019 |
| JP | 2019-206643 A | 12/2019 |
| WO | WO 2015/159538 A1 | 10/2015 |
| WO | WO 2018/186367 A1 | 10/2018 |
| WO | WO 2019/054226 A1 | 3/2019 |

OTHER PUBLICATIONS

Written Opinion of the International Searching Authority, issued in PCT/JP2021/027586, PCT/ISA/237, dated Sep. 28, 2021.
Extended European Search Report for European Application No. 21852990.7, dated Jun. 28, 2024.

* cited by examiner

PNEUMATIC TIRE

TECHNICAL FIELD

The present disclosure relates to a pneumatic tire.

BACKGROUND ART

In recent years, from the viewpoint of increasing interest in environmental issues and economic efficiency, there has been a growing demand for fuel efficiency in automobiles, and there is a strong demand for improved fuel efficiency also in pneumatic tires (hereinafter, simply referred to as "tires") installed in automobiles.

The fuel efficiency of a tire can be evaluated by rolling resistance, and it is known that the smaller the rolling resistance, the better the fuel efficiency of the tire.

Therefore, conventionally, it has been proposed to reduce the rolling resistance by devising the formulation of the rubber composition constituting the tread portion of the tire (for example, Patent Documents 1 to 4).

PRIOR ART DOCUMENTS

Patent Document

[Patent Document 1] JP2018-178034A
[Patent Document 2] JP2019-089911A
[Patent Document 3] WO2018/186367A
[Patent Document 4] JP2019-206643A

SUMMARY OF INVENTION

Problem to be Solved by the Invention

However, although the tire manufactured by the conventional technology described above can reduce the rolling resistance during normal low-speed running, the reduction in rolling resistance during high-speed running is not sufficient, and further reduction is desired. And it cannot be said that these tires have sufficient durability.

Accordingly, an object of the present disclosure is to provide a pneumatic tire with sufficiently reduced rolling resistance during high-speed running and excellent durability performance.

Means for Solving the Problem

The present discloser has diligently studied the solution to the above-mentioned problem, found that the above-mentioned problem can be solved by the disclosure described below, and has completed the present disclosure.

The present disclosure is;
a pneumatic tire having a sidewall and a clinch portion on each of a pair of side portions, wherein (tan $\delta$sw+tan $\delta$c)≤0.3 and |tan $\delta$sw−tan $\delta$c|≤0.07 are satisfied, where tan $\delta$sw is the loss tangent of the sidewall and tan $\delta$c is the loss tangent of the clinch portion, measured under the conditions of 70° C., frequency of 10 Hz, initial strain of 5%, and dynamic strain rate of 1%; and when the cross-sectional width of the tire is Wt (mm), the outer diameter is Dt (mm), and the volume of the space occupied by the tire is the virtual volume V (mm$^3$), when the tire is installed on a standardized rim and the internal pressure is 250 kPa, the tire satisfies following (formula 1) and (formula 2):

$$1700 \leq (Dt^2 \times \pi/4)/Wt \leq 2827.4 \quad \text{(formula 1)}$$

$$[(V+1.5 \times 10^7)/Wt] \leq 2.88 \times 10^5 \quad \text{(formula 2)}.$$

The Effect of the Invention

According to the present disclosure, it is possible to provide a pneumatic tire with sufficiently reduced the rolling resistance during high-speed running and excellent durability performance.

EMBODIMENTS FOR CARRYING OUT THE INVENTION

[1] Features of the Tire of the Present Disclosure

1. Overview

Figure 1:
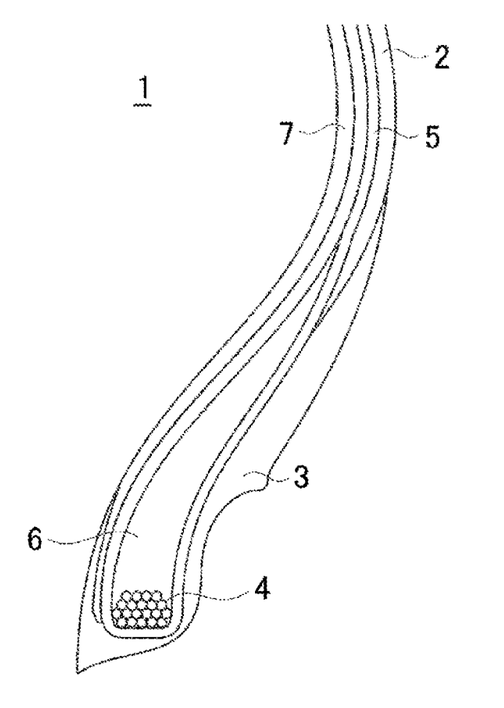
FIG. 1 is a partial cross-sectional view of a pneumatic tire according to an embodiment of the present disclosure.

FIG. 1 is a partial cross-sectional view of a tire according to the present disclosure. In FIG. 1, 1 is a tire, 2 is a sidewall, 3 is a clinch portion, 4 is a bead core, 5 is a carcass ply, 6 is a bead apex, and 7 is an inner liner. As shown in FIG. 1, the tire according to the present disclosure has a sidewall 2 and a clinch portion 3 disposed in a region of the bead portion contacting the rim flange, on each of a pair of side portions. It has the following characteristics.

First, the tire according to the present disclosure is characterized in that (tan $\delta$sw+tan $\delta$c)≤0.3 and |tan $\delta$sw−tan $\delta$c|≤0.07, where tan $\delta$sw is the loss tangent of the sidewall and tan $\delta$c is the loss tangent of the clinch portion, measured under the conditions of 70° C., frequency of 10 Hz, initial strain of 5%, and dynamic strain rate of 1%.

Further, the tire according to the present disclosure is characterized also in that, when the cross-sectional width of the tire is Wt (mm), the outer diameter is Dt (mm), and the volume of the space occupied by the tire is the virtual volume V (mm$^3$), when the tire is installed on a standardized rim and the internal pressure is 250 kPa, the tire satisfies following (formula 1) and (formula 2):

$$1700 \leq (Dt^2 \times \pi/4)/Wt \leq 2827.4 \quad \text{(formula 1)}$$

$$[(V+1.5 \times 10^7)/Wt] \leq 2.88 \times 10^5 \quad \text{(formula 2)}.$$

Having the characteristics described above, a tire with sufficiently reduced rolling resistance during high-speed running and sufficiently excellent durability performance can be provided.

In the above description, the "standardized rim" is a rim defined for each tire in the standard system including the standard on which the tire is based. For example, in the case of JATMA (Japan Automobile Tire Association), it is the standard rim in applicable sizes described in the "JATMA YEAR BOOK", in the case of "ETRTO (The European Tire and Rim Technical Organization)", it is "Measuring Rim" described in "STANDARDS MANUAL", and in the case of TRA (The Tire and Rim Association, Inc.), it is "Design Rim" described in "YEAR BOOK". In the case of tires that are not specified in the standard, it refers a rim that can be assembled and can maintain internal pressure, that is, the rim that does not cause air leakage from between the rim and the tire, and has the smallest rim diameter, and then the narrowest rim width.

Further, the outer diameter Dt of the tire is the outer diameter of the tire installed on a standardized rim, having an internal pressure of 250 kPa and in a no-load state. The cross-sectional width Wt (mm) of the tire is the width of tire installed on a standardized rim, having an internal pressure of 250 kPa and in a no-load state, and is the distance excluding patterns, letters, and the like on the tire side from the linear distance between the side portions (total width of the tire) including all the patterns, letters and the like on the tire side.

Further, the virtual volume V (mm$^3$) of the tire is, specifically, can be calculated by the following formula:

$$V=[(Dt/2)^2-\{(Dt/2)-Ht\}^2]\times\pi\times Wt$$

based on the outer diameter of tire Dt (mm), the tire cross-sectional height Ht (mm) (distance from the bottom of the bead to the outermost surface of the tread; ½ of the difference between the tire outer diameter and the nominal rim diameter), and the cross-sectional width of tire Wt (mm), in the state the tire is installed on a standardized rim, the internal pressure is 250 kPa and no load is applied.

2. Mechanism of Effect Manifestation in Tire According to the Present Disclosure The mechanism of effect manifestation in the tire according to the present disclosure, that is, the mechanism of suppressing the rolling resistance sufficiently at high-speed running and exerting excellent durability performance, is presumed as follows.

(1) Tire Shape

As described above, in the present disclosure, the cross-sectional width Wt (mm) and the outer diameter Dt (mm) of the said tire are tried to satisfy $1700 \leq (Dt^2 \times \pi/4)/Wt \leq 2827.4$ (formula 1).

By increasing the area when the tire is viewed from the lateral direction, $[(Dt/2)^2 \times \pi)=(Dt^2 \times \pi/4)]$, with respect to the cross-sectional width Wt of the tire, and satisfying the numerical range specified in (formula 1), it is considered that the repetition of deformation per unit time is reduced, as a result, the time that can be used for heat exchange is increased, thereby improving the heat release property of the side portion, and low rolling resistance can be achieved since the friction between the tread portion and the road surface can be reduced. In (formula 1), it is further preferably 1718 or more, further preferably 1733 or more, further preferably 1737 or more, further preferably 1740 or more, further preferably 1753 or more, further preferably 1758 or more, further preferably 1760 or more, further preferably 1763 or more, further preferably 1801 or more, further preferably 1811 or more, further preferably 1816 or more, further preferably 1818 or more, further preferably 1860 or more, further preferably 1865 or more, further preferably 1963.4 or more, further preferably 2004 or more, further preferably 2018 or more, further preferably 2027 or more, further preferably 2030 or more, further preferably 2033 or more, and further preferably 2113 or more.

However, such a tire has a large area when viewed from the lateral direction, that is, the larger the outer diameter Dt, the greater the centrifugal force during high-speed running, and there is a risk that the tire radius will grow large while rolling and the side portion will be stretched and thinned. Then, if an impact is applied to the thinned side portion, the tire may be damaged. In addition, as the outer diameter increases due to centrifugal force, the amount of deformation of the side portions also increases, so there is a risk that the rolling resistance during high-speed running cannot be sufficiently reduced.

Therefore, in the present disclosure, the virtual volume V (mm$^3$) and the cross-sectional width Wt (mm) of the tire are tried to satisfy $[(V+1.5\times10^7)/Wt] \leq 2.88\times10^5$ (formula 2).

In this way, it is considered that, by reducing the virtual volume V of the tire in accordance with the decrease in the cross-sectional width Wt of the tire, and reducing the volume of the tire itself, it is considered that the growth of the outer diameter due to the centrifugal force can be suppressed, and the damage resistance of the side portion can be improved when the impact is applied on the side portion. In addition, it is considered that the amount of deformation of the side portion can be suppressed.

$[(V+1.5\times10^7)/Wt]$ is further preferably $2.85\times10^5$ or less, further preferably $2.84\times10^5$ or less, further preferably $2.78\times10^5$ or less, further preferably $2.60\times10^5$ or less, further preferably $2.56\times10^5$ or less, further preferably $2.54\times10^5$ or less, further preferably $2.50\times10^5$ or less, further preferably $2.48\times10^5$ or less, further preferably $2.42\times10^5$ or less, further preferably $2.26\times10^5$ or less, further preferably $2.24\times10^5$ or less, further preferably $2.21\times10^5$ or less, further preferably $2.19\times10^5$ or less, further preferably $2.18\times10^5$ or less, and further preferably $2.16\times10^5$ or less.

At this time, it is more preferable that $[(V+2.0\times10^7)/Wt] \leq 2.88\times10^5$ (formula 3), and further preferable that $[(V+2.5\times10^7)/Wt] \leq 2.88\times10^5$ (formula 4).

The above $[(V+2.0\times10^7)/Wt]$ is further preferably $2.83\times10^5$ or less, further preferably $2.81\times10^5$ or less, further preferably $2.79\times10^5$ or less, further preferably $2.77\times10^5$ or less, further preferably $2.76\times10^5$ or less, further preferably $2.64\times10^5$ or less, further preferably $2.47\times10^5$ or less, further preferably $2.46\times10^5$ or less, further preferably $2.45\times10^5$ or less, further preferably $2.44\times10^5$ or less, and further preferably $2.43\times10^5$ or less.

Further, $[(V+2.5\times10^7)/Wt]$ is further preferably $2.85\times10^5$ or less, further preferably $2.76\times10^5$ or less, further preferably $2.75\times10^5$ or less, further preferably $2.72\times10^5$ or less, further preferably $2.71\times10^5$ or less, further preferably $2.70\times10^5$ or less, further preferably $2.69\times10^5$ or less, and further preferably $2.68\times10^5$ or less.

(2) Rubber Physical Properties of Sidewall and Clinch Portion

In the present disclosure, the sidewall and clinch portion are formed so that $(\tan \delta sw + \tan \delta c) \leq 0.3$ and $|\tan \delta sw - \tan \delta c| \leq 0.07$ are satisfied where $\tan \delta sw$ is the loss tangent of the sidewall and $\tan \delta c$ is the loss tangent of the clinch portion, measured under the conditions of 70° C., frequency of 10 Hz, initial strain of 5% and dynamic strain rate of 1%.

By setting $(\tan \delta sw + \tan \delta c) \leq 0.3$ in this way, it is considered that the amount of heat generated in the entire side portion can be reduced, and stretching due to expansion of air can be suppressed. In addition, by setting $|\tan \delta sw - \tan \delta c| \leq 0.07$, it is considered that the temperature rise of only one of the sidewall and the clinch portion, resulting in uneven extension of the side portion can be suppressed. Note that, $(\tan \delta sw + \tan \delta c)$ is more preferably 0.27 or less, further preferably 0.23 or less, further preferably less than 0.17, further preferably 0.16 or less, and further preferably 0.14 or less. In addition, $|\tan \delta sw - \tan \delta c|$ is more preferably 0.07 or less, further preferably 0.03 or less, further preferably 0.02 or less, and further preferably 0.00.

It is believed that these effects make it possible to further improve durability and low rolling resistance, and achieve both low rolling performance and excellent durability during high-speed running.

Each $\tan \delta$ described above can be measured using a rubber cut out from the sidewall and clinch portion of the tire, for example, by using a viscoelasticity measuring device such as "Eplexor (registered trademark)" manufactured by GABO.

[2] More Preferable Embodiment of the Tire According to the Present Disclosure

The tire according to the present disclosure can obtain a larger effect by taking the following embodiment.

1. Relationship Between E*Sw (MPa) and E*c (MPa)

In the tire according to the present disclosure, when the complex elastic modulus of the sidewall is E*sw (MPa), and the complex elastic modulus of the clinch portion is E*c (MPa), measured under the conditions of 70° C., frequency of 10 Hz, initial strain of 5%, and dynamic strain rate of 1%, it is preferable that (E*c−E*sw)≤8.0. In addition, (E*c−E*sw) is further preferably 5.5 or less, further preferably 5.3 or less, further preferably 5.0 or less, and further preferably 2.8 or less.

In this way, by not increasing the rigidity difference between the sidewall and the clinch portion more than necessary, it is possible to suppress the occurrence of uneven deformation of the side portion, and the low rolling performance and the durability during high-speed running can be further improved.

Each E* can be measured using a viscoelasticity measuring device such as "Eplexor (registered trademark)" manufactured by GABO in the same manner as the measurement of tan δ described above.

1. Aspect Ratio

The tire according to the present disclosure is preferably a tire having an aspect ratio of 40% or more, whereby, the side portion can be suppressed from becoming thinner by stretching, by increasing the height of the side portion of the tire and increasing the area of the side portion. As a result, the rigidity of the tread and sides is suppressed from being lowered, and uneven deformation of the tire can be suppressed. As a result, the total heat generation of the tire can be sufficiently reduced, the rolling resistance during high-speed running can be further reduced, and the durability of the tire can be further enhanced.

The aspect ratio (%) described above can be obtained by the following formula using the cross-sectional height Ht (mm) and the cross-sectional width Wt (mm) of the tire when the internal pressure is 250 kPa.

$$(Ht/Wt) \times 100 (\%)$$

The aspect ratio is more preferably 45% or more, further preferably 47.5% or more, further preferably 48% or more, further preferably 49% or more, further preferably 50% or more, further preferably 52.5% or more, further preferably 53% or more, further preferably 55% or more, further preferably 58% or more, and further preferably 59% or more. There is no particular upper limit, but for example, it is 100% or less.

3. Butadiene Rubber Content

If the area of the side portion is increased, the amount of heat generated by the side portion may become larger than the amount of heat released. Therefore, in the present disclosure, it was considered preferable that the sidewall and the clinch portion constituting the side portion each contain, as a rubber component, butadiene rubber, which is excellent in low heat generation, and the content thereof was investigated.

As a result, it was found that, when 10≤|Bsw−Bc|≤40 (formula 5) is satisfied, where the content in the sidewall is Bsw (parts by mass) and the content in the clinch portion is Bc (parts by mass), it is possible to sufficiently suppress the occurrence of uneven deformation of the side portion by suppressing the amount of heat generated in the side portion, and it is possible to further improve low rolling performance and durability performance during high-speed running.

4. Relationship Between Tan δSw, Tan δc, V and Wt

As described above, when the area of the side portion is increased, the amount of heat generated may be greater than the amount of heat released from the side portion. In order to prevent this, it is necessary to reduce the tan δ of the side portion as the area of the side portion increases to control heat generation.

Therefore, the relationship between V/Wt, which is an index related to the area of the doughnut-shaped side portion, and tan δ of the entire side portion, which is an index related to heat generation, that is, (tan δsw+tan δc), was examined, and it was found that, if (tan δsw+tan δc)×V/Wt≤50000 (formula 6) is satisfied, heat generation can be appropriately controlled, rolling resistance during high-speed running can be further reduced, and durability of the tire can be further enhanced. (tan δsw+tan δc)×V/Wt is more preferably 48789 or less, and further preferably 47637 or less.

Then, (tan δsw+tan δc)×V/Wt≤45000 (formula 7) is more preferable, further preferably 44488 or less, further preferably 43294 or less, further preferably 38705 or less, further preferably 36362 or less, further preferably 35863 or less, further preferably 33450 or less, further preferably 30500 or less, further preferably 27053 or less, further preferably 25335 or less, and further preferably 25085 or less, further preferably 23329 or less, further preferably 22975 or less, and further preferably 20914 or less.

3. Tire Shape

In the tire according to the present disclosure, when the tire is installed on a standardized rim and the internal pressure is 250 kPa, the specific outer diameter Dt (mm) is preferably, for example, 515 mm or more, more preferably 558 mm or more, further preferably 585 mm or more, further preferably 649 mm or more, further preferably 658 mm or more, further preferably 663 mm or more, further preferably 664 mm or more, further preferably 665 mm or more, further preferably 672 mm or more, and most preferably 673 mm or more.

On the other hand, it is preferably less than 843 mm, more preferably 733 mm or less, further preferably less than 725 mm, further preferably 718 mm or less, further preferably 717 mm or less, further preferably 716 mm or less, further preferably 714 mm or less, further preferably 710 mm or less, further preferably less than 707 mm, further preferably 692 mm or less, further preferably 690 mm or less, further preferably less than 685 mm, further preferably 684 mm or less, further preferably 680 mm or less, further preferably 679 mm or less, and further preferably 674 mm or less.

The specific cross-sectional width Wt (mm) is, for example, preferably 115 mm or more, more preferably 130 mm or more, further preferably 150 mm or more, further preferably 170 mm or more, still more preferably 175 mm or more, still more preferably 176 mm or more, still more preferably 177 mm or more, still more preferably 178 mm or more, still more preferably 181 mm or more, still more preferably 182 mm or more, even more preferably 185 mm, and most preferably 193 mm or more.

On the other hand, it is preferably less than 305 mm, more preferably less than 245 mm, further preferably 233 mm or less, further preferably 231 mm or less, further preferably 229 mm or less, further preferably 225 mm or less, further preferably less than 210 mm, further preferably less than 205 mm, further preferably 201 mm or less, further preferably 200 mm or less, further preferably less than 200 mm, and further preferably 199 mm or less.

The specific cross-sectional height Ht (mm) is, for example, preferably 37 mm or more, more preferably 69 mm or more, further preferably 70 mm or more, further preferably 78 mm or more, further preferably 79 mm or more, further preferably 80 mm or more, further preferably 87 mm or more, further preferably 88 mm or more, further preferably 90 mm or more, further preferably 95 mm or more, further preferably 96 mm or more, further preferably 98 mm or more, and further preferably 99 mm or more.

On the other hand, it is preferably less than 180 mm, more preferably 116 mm or less, further preferably 113 mm or less, further preferably less than 112 mm, further preferably 105 mm or less, further preferably 101 mm or less, and further preferably less than 101 mm.

The specific virtual volume V is preferably 13,000,000 mm$^3$ or more, more preferably 23,136,067 mm$^3$ or more, further preferably 23,206,160 mm$^3$ or more, further preferably 23,377,471 mm$^3$ or more, further preferably 28,575,587 mm$^3$ or more, further preferably 28,813,525 mm$^3$ or more, further preferably 29,000,000 mm$^3$ or more, further preferably 29,087,378 mm$^3$ or more, further preferably 29,823,416 mm$^3$ or more, further preferably 30,327,983 mm$^3$ or more, further preferably 34,466,507 mm$^3$ or more, further preferably 36,000,000 mm$^3$ or more, further preferably 36,015,050 mm$^3$ or more, further preferably 36,140,254 mm$^3$ or more, further preferably 36,203,610 mm$^3$ or more, further preferably 36,260,445 mm$^3$ or more, and further preferably 37,040,131 mm$^3$ or more.

On the other hand, it is preferably less than 66,000,000 mm$^3$, more preferably 51,283,296 mm$^3$ or less, more preferably less than 44,000,000 mm$^3$, further preferably 43,478,150 mm$^3$ or less, further preferably 42,045,141 mm$^3$ or less, further preferably 40,755,756 mm$^3$ or less, and further preferably less than 38,800,000 mm$^3$.

Further, in the present disclosure, considering the stability of the riding comfort during running, (Dt−2×Ht) is preferably 450 (mm) or more, more preferably 457 (mm) or more, further preferably 458 (mm) or more, further preferably 470 (mm) or more, further preferably 480 (mm) or more, further preferably 482 (mm) or more, and further preferably 483 (mm) or more.

On the other hand, considering the deformation of the tread portion, it is preferably less than 560 (mm), more preferably 559 (mm) or less, further preferably 558 (mm) or less, further preferably 534 (mm) or less, further preferably 533 (mm) or less, further preferably less than 530 (mm), further preferably less than 510 (mm), further preferably 508 (mm) or less, and further preferably 507 (mm) or less.

Further, in the present disclosure, the thickness S (mm) of the sidewall in the tire width direction at the maximum width of the tire is preferably 2.0 mm or less. By reducing the thickness S of the sidewalls in this way, further improvement in heat release property can be expected, and it is considered that rolling resistance and durability are improved. It is more preferably 1.9 mm or less, further preferably 1.8 mm or less, further preferably 1.7 mm or less, and further preferably 1.6 mm or less.

[3] Specific Embodiments of the Present Disclosure

Hereinafter, the present disclosure will be specifically described based on embodiments.
1. Tire Shape
In the present embodiment, when the cross-sectional width of the tire is Wt (mm), the outer diameter is Dt (mm), and the volume of the space occupied by the tire is the virtual volume V (mm$^3$), when the tire is installed on a standardized rim and the internal pressure is 250 kPa, the tire satisfies following (formula 1) and (formula 2):

$$1700 \leq (Dt^2 \times \pi/4)/Wt \leq 2827.4 \quad \text{(formula 1)}$$

$$[(V+1.5\times 10^7)/Wt] \leq 2.88\times 10^5 \quad \text{(formula 2)}.$$

By configuring the tire shape (Wt, Dt, V) in this way, it is possible to provide a pneumatic tire that sufficiently reduces rolling resistance during high-speed running and has excellent durability performance.

2. Rubber Composition
Unless otherwise specified, the following compounded materials can be used for the sidewalls and the clinch portion that constitute the side portion in the present embodiment. It can be obtained by appropriately adjusting the compounding amount according to the physical properties desired as the rubber composition for sidewalls and the rubber composition for the clinch portion.

(1) Compounding Material
(a) Rubber Component
In the present embodiment, as the rubber component, rubber (polymer) generally used for producing tires such as butadiene rubber (BR), styrene-butadiene rubber (SBR), isoprene-based rubber, and nitrile rubber (NBR) can be used. Among these, it is preferable to use butadiene rubber (BR) and isoprene-based rubber.

(a-1) BR
The content of BR in 100 parts by mass of the rubber component is preferably 40 parts by mass or more, more preferably 50 parts by mass or more, and even more preferably 55 parts by mass or more. On the other hand, the content is preferably 80 parts by mass or less, more preferably 75 parts by mass or less, and even more preferably 70 parts by mass or less.

As described above, the difference between the BR content (parts by mass) in the rubber composition for sidewall and the BR content (parts by mass) in the rubber composition for clinch portion is, preferably, 10 parts by mass or more and 40 parts by mass or less.

The weight average molecular weight of BR is, for example, more than 100,000 and less than 2 million. The vinyl bond amount of BR is, for example, more than 1% by mass and less than 30% by mass. The cis content of BR is, for example, more than 1% by mass and less than 98% by mass. The trans amount of BR is, for example, more than 1% by mass and less than 60% by mass. The cis content can be measured by infrared absorption spectrometry.

BR is not particularly limited, and BR with high cis content (90% or more of cis content), BR with low cis content, BR containing syndiotactic polybutadiene crystals, and the like can be used. BR may be either non-modified BR or modified BR. As modified BR, for example, BR modified with a compound (modifying agent) represented by the following formula can be used.

[Chemical 1]

In the formula, R$^1$, R$^2$ and R$^3$ represent, the same or different, alkyl group, alkoxy group, silyloxy group, acetal group, carboxyl group (—COOH), mercapto group (—SH) or derivatives thereof. R$^4$ and R$^5$ represent, the same or different, hydrogen atoms or alkyl groups. $R^4$ and $R^5$ may be combined to form a ring structure with nitrogen atoms. n represents an integer.

As the modified BR modified with the compound (modifier) represented by the above formula, a BR whose polymer terminal (active terminal) has been modified with the compound represented by the above formula can be mentioned.

As $R^1$, $R^2$ and $R^3$, an alkoxy group is preferable (preferably an alkoxy group having 1 to 8 carbon atoms, more preferably an alkoxy group having 1 to 4 carbon atoms). As $R^4$ and $R^5$, an alkyl group (preferably an alkyl group having 1 to 3 carbon atoms) is preferable. n is preferably 1 to 5, more preferably 2 to 4, and even more preferably 3. Further, when $R^4$ and $R^5$ are bonded to form a ring structure together with a nitrogen atom, a 4- to 8-membered ring is preferable. The alkoxy group also includes a cycloalkoxy group (for example, cyclohexyloxy group) and an aryloxy group (for example, phenoxy group, benzyloxy group).

Specific examples of the above modifying agent include 2-dimethylaminoethyltrimethoxysilane, 3-dimethylaminopropyltrimethoxysilane, 2-dimethylaminoethyltriethoxysilane, 3-dimethylaminopropyltriethoxysilane, 2-diethylaminoethyltrimethoxysilane, 3-diethylaminopropyltrimethoxysilane, 2-diethylaminoethyltriethoxysilane, and 3-diethylaminopropyltriethoxysilane. These may be used alone or in combination of two or more.

Further, as the modified BR, a modified BR modified with the following compound (modifying agent) can also be used. Examples of the modifying agent include
- polyglycidyl ethers of polyhydric alcohols such as ethylene glycol diglycidyl ether, glycerin triglycidyl ether, trimethylolethanetriglycidyl ether, and trimethylolpropane triglycidyl ether;
- polyglycidyl ethers of aromatic compounds having two or more phenol groups such as diglycidylated bisphenol A;
- polyepoxy compounds such as 1,4-diglycidylbenzene, 1,3,5-triglycidylbenzene, and polyepoxidized liquid polybutadiene;
- epoxy group-containing tertiary amines such as 4,4'-diglycidyl-diphenylmethylamine, and 4,4'-diglycidyl-dibenzylmethylamine;
- diglycidylamino compounds such as diglycidylaniline, N,N'-diglycidyl-4-glycidyloxyaniline, diglycidyl orthotoluidine, tetraglycidylmetaxylenidiamine, tetraglycidylaminodiphenylmethane, tetraglycidyl-p-phenylenediamine, diglycidylaminomethylcyclohexane, and tetraglycidyl-1,3-bisaminomethylcyclohexane;
- amino group-containing acid chlorides such as bis-(1-methylpropyl) carbamate chloride, 4-morpholincarbonyl chloride, 1-pyrrolidinecarbonyl chloride, N,N-dimethylcarbamide acid chloride, and N,N-diethylcarbamide acid chloride;
- epoxy group-containing silane compounds such as 1,3-bis-(glycidyloxypropyl)-tetramethyldisiloxane, and (3-glycidyloxypropyl)-pentamethyldisiloxane;
- sulfide group-containing silane compound such as (trimethylsilyl) [3-(trimethoxysilyl) propyl] sulfide, (trimethylsilyl) [3-(triethoxysilyl) propyl] sulfide, (trimethylsilyl) [3-(tripropoxysilyl) propyl] sulfide, (trimethylsilyl) [3-(tributoxysilyl) propyl] sulfide, (trimethylsilyl) [3-(methyldimethoxysilyl) propyl] sulfide, (trimethylsilyl) [3-(methyldiethoxysilyl) propyl] sulfide, (trimethylsilyl) [3-(methyldipropoxysilyl) propyl] sulfide, and (trimethylsilyl) [3-(methyldibutoxysilyl) propyl] sulfide;
- N-substituted aziridine compound such as ethyleneimine and propyleneimine;
- alkoxysilanes such as methyltriethoxysilane, N,N-bis (trimethylsilyl)-3-aminopropyltrimethoxysilane, N,N-bis (trimethylsilyl)-3-aminopropyltriethoxysilane, N,N-bis (trimethylsilyl) aminoethyltrimethoxysilane, and N,N-bis (trimethylsilyl) aminoethyltriethoxysilane;
- (thio) benzophenone compound having an amino group and/or a substituted amino group such as 4-N,N-dimethylaminobenzophenone, 4-N, N-di-t-butylaminobenzophenone, 4-N,N-diphenylamino benzophenone, 4,4'-bis (dimethylamino) benzophenone, 4,4'-bis (diethylamino) benzophenone, 4,4'-bis (diphenylamino) benzophenone, and N,N,N',N'-bis-(tetraethylamino) benzophenone;
- benzaldehyde compounds having an amino group and/or a substituted amino group such as 4-N,N-dimethylaminobenzaldehyde, 4-N, N-diphenylaminobenzaldehyde, and 4-N,N-divinylamino benzaldehyde;
- N-substituted pyrolidone such as N-methyl-2-pyrrolidone, N-vinyl-2-pyrrolidone, N-phenyl-2-pyrrolidone, N-t-butyl-2-pyrrolidone, and N-methyl-5-methyl-2-pyrrolidone;
- N-substituted piperidone such as methyl-2-piperidone, N-vinyl-2-piperidone, and N-phenyl-2-piperidone;
- N-substituted lactams such as N-methyl-ε-caprolactam, N-phenyl-ε-caprolactum, N-methyl-ω-laurilolactum, N-vinyl-ω-laurilolactum, N-methyl-β-propiolactam, and N-phenyl-β-propiolactam; and
- N,N-bis-(2,3-epoxypropoxy)-aniline, 4,4-methylene-bis-(N,N-glycidylaniline), tris-(2,3-epoxypropyl)-1,3,5-triazine-2,4,6-triones, N,N-diethylacetamide, N-methylmaleimide, N,N-diethylurea, 1,3-dimethylethylene urea, 1,3-divinylethyleneurea, 1,3-diethyl-2-imidazoliclinone, 1-methyl-3-ethyl-2-imidazoliclinone, 4-N,N-dimethylaminoacetophenone, 4-N,N-diethylaminoacetophenone, 1,3-bis (diphenylamino)-2-propanone, and 1,7-bis(methylethylamino)-4-heptanone. The modification with the above compound (modifying agent) can be carried out by a known method. These modified BRs may be used alone or in combination of two or more.

As BR, for example, products of Ube Industries, Ltd., JSR Corporation, Asahi Kasei Co., Ltd., Nippon Zeon Co., Ltd., etc. can be used.

(a-2) Isoprene Rubber

The content (total content) of the isoprene-based rubber in 100 parts by mass of the rubber component is preferably 25 parts by mass or more, more preferably 30 parts by mass or more, and further preferably 35 parts by mass or more. On the other hand, it is preferably 55 parts by mass or less, more preferably 50 parts by mass or less, and further preferably 45 parts by mass or less.

Examples of the isoprene-based rubber include natural rubber (NR), isoprene rubber (IR), reformed NR, modified NR, and modified IR. Among them, NR is preferable from the viewpoint of excellent strength.

As the NR, for example, SIR20, RSS #3, TSR20 and the like, which are common in the tire industry, can be used. The IR is not particularly limited, and for example, IR 2200 manufactured by Nippon Zeon Co., Ltd. and the like, which are common in the tire industry, can be used. Reformed NR includes deproteinized natural rubber (DPNR), high-purity natural rubber (UPNR), and the like. Modified NR includes epoxidized natural rubber (ENR), hydrogenated natural rubber (HNR), grafted natural rubber, and the like. Modified IR includes epoxidized isoprene rubber, hydrogenated isoprene rubber, grafted isoprene rubber, and the like. These may be used alone or in combination of two or more.

(a-3) SBR

The rubber component may contain SBR as required. At this time, the content of SBR in 100 parts by mass of the rubber component is, for example, 1 part by mass or more and less than 100 parts by mass. It is more preferably more than 5 parts by mass, and further preferably more than 15 parts by mass, and more than 25 parts by mass is particularly preferable. On the other hand, it is preferably less than 65 parts by mass, more preferably less than 55 parts by mass, and further preferably less than 45 parts by mass, and less than 35 parts by mass is particularly preferable.

The weight average molecular weight of SBR is, for example, more than 100,000 and less than 2 million. The styrene content of SBR is, for example, preferably more than 5% by mass and less than 50% by mass, more preferably more than 10% by mass and less than 40% by mass, and further preferably more than 20% by mass and less than 35% by mass. The vinyl bond amount (1,2-bonded butadiene unit amount) of SBR is, for example, more than 5% by mass and less than 70% by mass. The structure identification of SBR (measurement of styrene content and vinyl bond amount) can be performed using, for example, an apparatus of the JNM-ECA series manufactured by JEOL Ltd.

The SBR is not particularly limited, and for example, emulsion-polymerized styrene-butadiene rubber (E-SBR), solution-polymerized styrene-butadiene rubber (S-SBR) and the like can be used. The SBR may be either a non-modified SBR or a modified SBR, and these may be used alone or in combination of two or more.

The modified SBR may be any SBR having a functional group that interacts with a filler such as silica. Examples thereof include     end-modified SBR (end-modified SBR having the above functional group at the terminal) in which at least one end of the SBR is modified with a compound having the above functional group (modifying agent),     main chain modified SBR having the functional group in the main chain,     main chain terminal modified SBR having the functional group at the main chain and the terminal (for example, a main chain terminal modified SBR having the above functional group to the main chain and having at least one end modified with the above modifying agent), and     end-modified SBR which is modified (coupled) with a polyfunctional compound having two or more epoxy groups in the molecule, and into which an epoxy group or hydroxyl group has been introduced, As the SBR, for example, SBR manufactured and sold by Sumitomo Chemical Co., Ltd., JSR Corporation, Asahi Kasei Co., Ltd., Nippon Zeon Co., Ltd, etc. can be used. The SBR may be used alone or in combination of two or more.

(a-4) Other Rubber Components

Further, as another rubber component, the rubber composition may contain a rubber (polymer) generally used in the production of tires, such as nitrile rubber (NBR).

(b) Compounding Materials Other than Rubber Components (b-1) Filler

In the present embodiment, the rubber composition preferably contains reinforcing agents such as carbon black and silica as fillers. Examples of fillers include graphite, calcium carbonate, talc, alumina, clay, aluminum hydroxide, and mica, in addition to carbon black and silica. When using silica, it is preferable to use together with a silane coupling agent.

(i) Carbon Black

The content of carbon black with respect to 100 parts by mass of the rubber component is preferably 10 parts by mass or more and 100 parts by mass or less, more preferably 30 parts by mass or more and 90 parts by mass or less, and further preferably 35 parts by mass or more and 80 parts by mass or less. As a result, it is possible to improve the crack growth resistance, durability, ultraviolet deterioration resistance, and the like of the tire.

Nitrogen adsorption specific surface area ($N_2SA$) of carbon black is, for example, more than 30 $m^2/g$ and less than 250 $m^2/g$. The amount of dibutyl phthalate (DBP) absorbed by carbon black is, for example, more than 50 ml/100 g and less than 250 ml/100 g. The nitrogen adsorption specific surface area of carbon black is measured according to ASTM D4820-93, and the amount of DBP absorbed is measured according to ASTM D2414-93.

The carbon black is not particularly limited, and examples thereof includes furnace black (furnace carbon black) such as SAF, ISAF, HAF, MAF, FEF, SRF, GPF, APF, FF, CF, SCF and ECF; acetylene black (acetylene carbon black); thermal black (thermal carbon black) such as FT and MT; and channel black (channel carbon black) such as EPC, MPC and CC.

Commercially available products include, for example, products of Asahi Carbon Co., Ltd., Cabot Japan Co., Ltd., Tokai Carbon Co., Ltd., Mitsubishi Chemical Corporation, Lion Corporation, Shin Nikka Carbon Co., Ltd., Columbia Carbon Co., Ltd., etc. These may be used alone or in combination of two or more.

(ii) Silica

The rubber composition may contain silica, if necessary. The BET specific surface area of the silica is preferably more than 140 $m^2/g$, more preferably more than 160 $m^2/g$, from the viewpoint of obtaining good durability performance. On the other hand, from the viewpoint of obtaining good rolling resistance at high-speed running, it is preferably less than 250 $m^2/g$, and more preferably less than 220 $m^2/g$. Moreover, the content of the silica with respect to 100 parts by mass of the rubber component is preferably more than 35 parts by mass, more preferably more than 40 parts by mass, and further preferably more than 45 parts by mass, from the viewpoint of obtaining good durability performance. On the other hand, from the viewpoint of obtaining good rolling resistance during high-speed running, it is preferably less than 70 parts by mass, more preferably less than 65 parts by mass, and further preferably less than 60 parts by mass. The above-mentioned BET specific surface area is the value of $N_2SA$ measured by the BET method according to ASTM D3037-93.

Examples of silica include dry silica (anhydrous silica) and wet silica (hydrous silica). Among them, wet silica is preferable because it has large number of silanol groups.

As the silica, for example, products of Degussa, Rhodia, Tosoh Silica Co., Ltd., Solvay Japan Co., Ltd., Tokuyama Corporation, etc. can be used.

(iii) Silane Coupling Agent

When using silica as a filler, it is preferable to use a silane coupling agent together with the silica, as mentioned above. The silane coupling agent is not particularly limited. Examples of the silane coupling agent include     sulfide-based ones such as bis(3-triethoxysilylpropyl)tetrasulfide, bis (2-triethoxysilylethyltetrasulfide, bis (4-triethoxysilylbutyl)tetrasulfide, bis(3-trimethoxysilylpropyl) tetrasulfide, bis(2-trimethoxysilylethyl) tetrasulfide, bis(2-triethoxysilylethyltrisulfide, bis(4-trimethoxysilylbutyl) trisulfide, bis(3-triethoxysilylpropyldisulfide, bis(2-triethoxysilylethyl)

disulfide, bis(4-triethoxysilylbutyldisulfide, bis(3-trimethoxysilylpropyl) disulfide, bis(2-trimethoxysilylethyldisulfide, bis(4-trimethoxysilylbutyl) disulfide, 3-trimethoxysilylpropyl-N,N-dimethylthiocarbamoyltetrasulfide, 2-triethoxysilylethyl-N,N-dimethylthiocarbamoyltetrasulfide, and 3-triethoxysilylpropyl-methacrylatemonosulfide;

mercapto-based ones such as 3-mercaptopropyltrimethoxysilane, 2-mercaptoethyltriethoxysilane, and NXT and NXT-Z manufactured by Momentive;

vinyl-based ones such as vinyl triethoxysilane, and vinyl trimethoxysilane;

amino-based ones such as 3-aminopropyltriethoxysilane and 3-aminopropyltrimethoxysilane;

glycidoxy-based ones such as γ-glycidoxypropyltriethoxysilane and γ-glycidoxypropyltrimethoxysilane;

nitro-based ones such as 3-nitropropyltrimethoxysilane, and 3-nitropropyltriethoxysilane; and chloro-based ones such as 3-chloropropyltrimethoxysilane and 3-chloropropyltriethoxysilane. These may be used alone or in combination of two or more.

As the silane coupling agent, for example, products of Degussa, Momentive, Shinetsu Silicone Co., Ltd., Tokyo Chemical Industry Co., Ltd., Azumax Co., Ltd., Toray Dow Corning Co., Ltd., etc. can be used.

The content of the silane coupling agent is, for example, more than 3 parts by mass and less than 25 parts by mass with respect to 100 parts by mass of silica.

(iv) Other Fillers

The rubber composition may further contain fillers such as graphite, calcium carbonate, talc, alumina, clay, aluminum hydroxide, and mica, which are generally used in the tire industry, in addition to the above-mentioned carbon black and silica. These contents are, for example, more than 0.1 part by mass and less than 200 parts by mass with respect to 100 parts by mass of the rubber component.

(b-2) Softener

The rubber composition may contain oil (including extender oil), liquid rubber, or the like, as a softener. The total content of these is preferably more than 5 parts by mass, more preferably more than 10 parts by mass, and further more than 12 parts by mass with respect to 100 parts by mass of the rubber component. On the other hand, less than 30 parts by mass is preferable, less than 20 parts by mass is more preferred, and less than 17 parts by mass is further preferred. The oil content also includes the amount of oil contained in rubber (oil-extended rubber).

Examples of the oil include mineral oil, generally referred to as process oil, vegetable oil and fat, and a mixture thereof. As the mineral oil (process oil), for example, a paraffinic process oil, an aroma-based process oil, a naphthene process oil, or the like can be used. Examples of the vegetable oils and fats include castor oil, cottonseed oil, linseed oil, rapeseed oil, soybean oil, palm oil, coconut oil, peanut oil, rosin, pine oil, pine tar, tall oil, corn oil, rice oil, beni-flower oil, sesame oil, olive oil, sunflower oil, palm kernel oil, camellia oil, jojoba oil, macadamia nut oil, and tung oil. These may be used alone or in combination of two or more.

Examples of process oil (mineral oil) include products of Idemitsu Kosan Co., Ltd., Sankyo Yuka Kogyo Co., Ltd., Japan Energy Co., Ltd., Olisoy Co., Ltd., H & R Co., Ltd., Toyokuni Seiyu Co., Ltd., Showa Shell Sekiyu Co., Ltd., and Fuji Kosan Co., Ltd.

The liquid rubber mentioned as the softener is a polymer in a liquid state at room temperature (25° C.) and is a polymer having a monomer similar to that of solid rubber as a constituent element. Examples of the liquid rubber include farnesene-based polymers, liquid diene-based polymers, and hydrogenated additives thereof.

The farnesene-based polymer is a polymer obtained by polymerizing farnesene, and has a structural unit based on farnesene. Farnesene includes isomers such as α-farnesene ((3E,7E)-3,7,11-trimethyl-1,3,6,10-dodecatetraene) and β-farnesene (7,11-dimethyl-3-methylene-1,6,10-dodecatrien).

The farnesene-based polymer may be a homopolymer of farnesene (farnesene homopolymer) or a copolymer of farnesene and a vinyl monomer (farnesene-vinyl monomer copolymer).

Examples of the liquid diene polymer include a liquid styrene-butadiene copolymer (liquid SBR), a liquid butadiene polymer (liquid BR), a liquid isoprene polymer (liquid IR), and a liquid styrene isoprene copolymer (liquid SIR).

The liquid diene polymer has a polystyrene-converted weight average molecular weight (Mw) measured by gel permeation chromatography (GPC) of, for example, more than $1.0 \times 10^3$ and less than $2.0 \times 10^5$. In the present specification, Mw of the liquid diene polymer is a polystyrene conversion value measured by gel permeation chromatography (GPC).

As the liquid rubber, for example, products of Kuraray Co., Ltd. and Clay Valley Co., Ltd. can be used.

(b-3) Resin Component

The rubber composition preferably contains a resin component, if necessary. The resin component may be solid or liquid at room temperature, and specific examples of resin components include styrene resin, coumarone resin, terpene resin, C5 resin, C9 resin, C5C9 resin, and acrylic resin. Two or more kinds of the resin components may be used in combination. The content of the resin component with respect to 100 parts by mass of the rubber component is preferably more than 2 parts by mass and less than 45 parts by mass, and more preferably less than 30 parts by mass.

The styrene resin is a polymer using a styrene monomer as a constituent monomer, and examples thereof include a polymer obtained by polymerizing a styrene monomer as a main component (50% by mass or more). Specifically, it includes homopolymers obtained by individually polymerizing styrene monomers (styrene, o-methylstyrene, m-methylstyrene, p-methylstyrene, α-methylstyrene, p-methoxystyrene, p-tert-butylstyrene, p-phenylstyrene, o-chlorostyrene, m-chlorostyrene, p-chlorostyrene, etc.), copolymers obtained by copolymerizing two or more styrene monomers, and, in addition, copolymers obtained by copolymerizing a styrene monomer and other monomers that can be copolymerized with the styrene monomer.

Examples of the other monomers include acrylonitriles such as acrylonitrile and methacrylate; unsaturated carboxylic acids such as acrylic acid and methacrylic acid; unsaturated carboxylic acid esters such as methyl acrylate and methyl methacrylate; dienes such as chloroprene, butadiene, and isoprene, olefins such as 1-butene and 1-pentene; and α,β-unsaturated carboxylic acids such as maleic anhydride and acid anhydrides thereof.

As the coumarone-based resin, coumarone-indene resin is preferably used. Coumarone-indene resin is a resin containing coumarone and indene as monomer components constituting the skeleton (main chain) of the resin. Examples of the monomer component contained in the skeleton other than coumarone and indene include styrene, α-methylstyrene, methylindene, and vinyltoluene.

The content of the coumarone-indene resin is, for example, more than 1.0 part by mass and less than 50.0 parts by mass with respect to 100 parts by mass of the rubber component.

The hydroxyl value (OH value) of the coumarone-indene resin is, for example, more than 15 mgKOH/g and less than 150 mgKOH/g. The OH value is the amount of potassium hydroxide required to neutralize acetic acid bonded to a hydroxyl group when 1 g of the resin is acetylated, and is expressed in milligrams. It is a value measured by potentiometric titration method (JIS K 0070: 1992).

The softening point of the coumarone-indene resin is, for example, higher than 30° C. and lower than 160° C. The softening point is the temperature at which the ball drops when the softening point defined in JIS K 6220-1: 2001 is measured by a ring-ball type softening point measuring device.

Examples of the terpene resins include polyterpenes, terpene phenols, and aromatic-modified terpene resins. Polyterpene is a resin obtained by polymerizing a terpene compound and a hydrogenated product thereof. The terpene compound is a hydrocarbon having a composition of $(C_5H_8)_n$ or an oxygen-containing derivative thereof, which is a compound having a terpene classified as monoterpenes $(C_{10}H_{16})$, sesquiterpenes $(C_{15}H_{24})$, diterpenes $(C_{20}H_{32})$, etc. as the basic skeleton. Examples thereof include α-pinene, β-pinene, dipentene, limonene, myrcene, alloocimene, ocimene, α-phellandrene, α-terpinene, γ-terpinene, terpinolene, 1,8-cineol, 1,4-cineol, α-terpineol, β-terpineol, and γ-terpineol.

Examples of the polyterpene include terpene resins such as α-pinene resin, β-pinene resin, limonene resin, dipentene resin, and β-pinene/limonene resin, which are made from the above-mentioned terpene compound, as well as hydrogenated terpene resin obtained by hydrogenating the terpene resin. Examples of the terpene phenol include a resin obtained by copolymerizing the above-mentioned terpene compound and the phenol compound, and a resin obtained by hydrogenating above-mentioned resin. Specifically, a resin obtained by condensing the above-mentioned terpene compound, the phenol compound and formalin can be mentioned. Examples of the phenol compound include phenol, bisphenol A, cresol, and xylenol. Examples of the aromatic-modified terpene resin include a resin obtained by modifying a terpene resin with an aromatic compound, and a resin obtained by hydrogenating the above-mentioned resin. The aromatic compound is not particularly limited as long as it is a compound having an aromatic ring, and examples thereof include phenol compounds such as phenol, alkylphenol, alkoxyphenol, and unsaturated hydrocarbon group-containing phenol; naphthol compounds such as naphthol, alkylnaphthol, alkoxynaphthol, and unsaturated hydrocarbon group-containing naphthols; styrene derivatives such as styrene, alkylstyrene, alkoxystyrene, unsaturated hydrocarbon group-containing styrene; coumarone; and indene.

The C5 resin refers to a resin obtained by polymerizing a C5 fraction. Examples of the C5 fraction include petroleum fractions having 4 to 5 carbon atoms such as cyclopentadiene, pentene, pentadiene, and isoprene. As the C5-based petroleum resin, a dicyclopentadiene resin (DCPD resin) is preferably used.

The C9 resin refers to a resin obtained by polymerizing a C9 fraction, and may be hydrogenated or modified. Examples of the C9 fraction include petroleum fractions having 8 to 10 carbon atoms such as vinyltoluene, alkylstyrene, indene, and methyl indene. As the specific examples, a coumarone-indene resin, a coumarone resin, an indene resin, and an aromatic vinyl resin are preferably used. As the aromatic vinyl resin, a homopolymer of α-methylstyrene or styrene or a copolymer of α-methylstyrene and styrene is preferable because it is economical, easy to process, and excellent in heat generation. A copolymer of α-methylstyrene and styrene is more preferred. As the aromatic vinyl-based resin, for example, those commercially available from Clayton, Eastman Chemical, etc. can be used.

The C5C9 resin refers to a resin obtained by copolymerizing the C5 fraction and the C9 fraction, and may be hydrogenated or modified. Examples of the C5 fraction and the C9 fraction include the above-mentioned petroleum fraction. As the C5C9 resin, for example, those commercially available from Tosoh Corporation, LUHUA, etc. can be used.

The acrylic resin is not particularly limited, but for example, a solvent-free acrylic resin can be used.

As the solvent-free acrylic resin, a (meth) acrylic resin (polymer) synthesized by a high-temperature continuous polymerization method (high-temperature continuous lump polymerization method (a method described in U.S. Pat. No. 4,414,370 B, JP 84-6207 A, JP 93-58805 B, JP 89-313522 A, U.S. Pat. No. 5,010,166 B, Toa Synthetic Research Annual Report TREND2000 No. 3 p 42-45, and the like) without using polymerization initiators, chain transfer agents, organic solvents, etc. as auxiliary raw materials as much as possible, can be mentioned. In the present disclosure, (meth) acrylic means methacrylic and acrylic.

Examples of the monomer component constituting the acrylic resin include (meth) acrylic acid, and (meth) acrylic acid derivatives such as (meth) acrylic acid ester (alkyl ester, aryl ester, aralkyl ester, etc.), (meth) acrylamide, and (meth) acrylamide derivative.

In addition, as the monomer component constituting the acrylic resin, aromatic vinyl compounds such as styrene, α-methylstyrene, vinyltoluene, vinylnaphthalene, divinylbenzene, trivinylbenzene, divinylnaphthalene, and the like may be used, together with (meth) acrylic acid or (meth) acrylic acid derivative.

The acrylic resin may be a resin composed of only a (meth) acrylic component or a resin also having a component other than the (meth) acrylic component. Further, the acrylic resin may have a hydroxyl group, a carboxyl group, a silanol group, or the like.

As the resin component, for example, a product of Maruzen Petrochemical Co., Ltd., Sumitomo Bakelite Co., Ltd., Yasuhara Chemical Co., Ltd., Toso Co., Ltd., Rutgers Chemicals Co., Ltd., BASF Co., Ltd., Arizona Chemical Co., Ltd., Nitto Chemical Co., Ltd., Co., Ltd., Nippon Catalyst Co., Ltd., JX Energy Co., Ltd., Arakawa Chemical Industry Co., Ltd., Taoka Chemical Industry Co., Ltd. can be used.

(b-4) Anti-Aging Agent

The rubber composition preferably contains an anti-aging agent. Content of the anti-aging agent is, for example, more than 1 part by mass and less than 10 parts by mass with respect to 100 parts by mass of the rubber component.

Examples of the antiaging agent include naphthylamine-based antiaging agents such as phenyl-α-naphthylamine; diphenylamine-based antiaging agents such as octylated diphenylamine and 4,4'-bis (α,α'-dimethylbenzyl) diphenylamine; p-phenylenediamine-based anti-aging agent such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline-based anti-aging agent such as a polymer of 2,2,4-trimethyl-1,2-dihydroquinolin; monophenolic anti-aging agents such as 2,6-di-t-butyl-4-methylphenol, styrenated phenol; bis, tris, polyphenolic anti-aging agents such as tetrakis-[methylene-3-(3',5'-di-t-butyl-4'-hydroxyphenyl)propionate] methane. These may be used alone or in combination of two or more.

As the anti-aging agent, for example, products of Seiko Chemical Co., Ltd., Sumitomo Chemical Co., Ltd., Ouchi Shinko Chemical Industry Co., Ltd., Flexsys Co., Ltd., etc. can be used.

(b-5) Stearic Acid

The rubber composition may contain stearic acid. Content of stearic acid is, for example, more than 0.5 parts by mass and less than 10.0 parts by mass with respect to 100 parts by mass of the rubber component. As the stearic acid, conventionally known ones can be used, and, for example, products of NOF Corporation, NOF Corporation, Kao Corporation, Fuji film Wako Pure Chemical Industries, Ltd., and Chiba Fatty Acid Co., Ltd., etc. can be used.

(b-6) Zinc Oxide

The rubber composition may contain zinc oxide. Content of zinc oxide is, for example, more than 0.5 parts by mass and less than 10 parts by mass with respect to 100 parts by mass of the rubber component. As the zinc oxide, conventionally known ones can be used, for example, products of Mitsui Metal Mining Co., Ltd., Toho Zinc Co., Ltd., Hakusui Tech Co., Ltd., Shodo Chemical Industry Co., Ltd., Sakai Chemical Industry Co., Ltd., etc. can be used.

(b-7) Wax

The rubber composition preferably contains wax. Content of the wax is, for example, 0.5 to 20 parts by mass, preferably 1.0 to 15 parts by mass, and more preferably 1.5 to 10.0 parts by mass with respect to 100 parts by mass of the rubber component.

The wax is not particularly limited, and examples thereof include petroleum waxes such as paraffin wax and microcrystalline wax; natural waxes such as plant wax and animal wax; and synthetic waxes such as a polymer of ethylene or propylene. These may be used alone or in combination of two or more.

As the wax, for example, products of Ouchi Shinko Chemical Industry Co., Ltd., Nippon Seiro Co., Ltd., and Seiko Kagaku Co., Ltd. can be used.

(b-8) Crosslinking Agent and Vulcanization Accelerator

The rubber composition preferably contains a cross-linking agent such as sulfur. Content of the cross-linking agent is, for example, more than 0.1 part by mass and less than 10.0 parts by mass with respect to 100 parts by mass of the rubber component.

Examples of sulfur include powdered sulfur, precipitated sulfur, colloidal sulfur, insoluble sulfur, highly dispersible sulfur, and soluble sulfur, which are commonly used in the rubber industry. These may be used alone or in combination of two or more.

As the sulfur, for example, products of Tsurumi Chemical Industry Co., Ltd., Karuizawa Sulfur Co., Ltd., Shikoku Chemicals Corporation, Flexsys Co., Ltd., Nippon Kanryu Kogyo Co., Ltd., Hosoi Chemical Industry Co., Ltd., etc. can be used.

Examples of the cross-linking agent other than sulfur include vulcanizing agents containing a sulfur atom such as Tackirol V200 manufactured by Taoka Chemical Industry Co., Ltd., DURALINK HTS (1,6-hexametdihylene-sodium dithiosulfate dihydrate) manufactured by Flexsys, and KA9188 (1,6-bis (N,N'-dibenzylthiocarbamoyldithio) hexane) manufactured by Lanxess; and organic peroxides such as dicumylperoxide.

The rubber composition preferably contains a vulcanization accelerator. Content of the vulcanization accelerator is, for example, more than 0.3 parts by mass and less than 10.0 parts by mass with respect to 100 parts by mass of the rubber component.

Examples of the vulcanization accelerator include thiazole-based vulcanization accelerators such as 2-mercaptobenzothiazole, di-2-benzothiazolyl disulfide, and N-cyclohexyl-2-benzothiadylsulfenamide;

thiuram-based vulcanization accelerators such as tetramethylthiuram disulfide (TMTD), tetrabenzyltiuram disulfide (TBzTD), and tetrakis (2-ethylhexyl) thiuram disulfide (TOT-N);

sulfenamide-based vulcanization accelerators such as N-cyclohexyl-2-benzothiazolesulfenamide, N-t-butyl-2-benzothiazolyl sulfenamide, N-oxyethylene-2-benzothiazolesulfenamide, N-oxyethylene-2-benzothiazolesulfenamide, and N,N'-diisopropyl-2-benzothiazolesulfenamide; and guanidine-based vulcanization accelerators such as diphenylguanidine, di-orthotolylguanidine and ortho-tolylbiguanidine. These may be used alone or in combination of two or more.

(b-9) Other

In addition to the above components, the rubber composition may further contain additives generally used in the tire industry, such as fatty acid metal salts, carboxylic acid metal salts, and organic peroxides. Content of these additives is, for example, more than 0.1 part by mass and less than 200 parts by mass with respect to 100 parts by mass of the rubber component.

(2) Production of Rubber Composition for Forming the Side Portion

The rubber composition is produced by a general method, for example, a manufacturing method including a base kneading step of kneading a rubber component with a filler such as carbon black, and a finish kneading step of kneading the kneaded product obtained in the base kneading step and a cross-linking agent.

The kneading can be performed using a known (sealed) kneader such as a banbury mixer, a kneader, or an open roll.

The kneading temperature in the base kneading step is, for example, higher than 50° C. and lower than 200° C., and the kneading time is, for example, more than 30 seconds and less than 30 minutes. In the base kneading process, in addition to the above components, compounding agents conventionally used in the rubber industry, such as softeners such as oil, stearic acid, zinc oxide, antiaging agents, waxes, and vulcanization accelerators, may be appropriately added and kneaded as needed.

In the finish kneading step, the kneaded product obtained in the base kneading step and the cross-linking agent are kneaded. The kneading temperature in the finish kneading step is, for example, above room temperature and lower than 80° C., and the kneading time is, for example, more than 1 minute and less than 15 minutes. In the finish kneading step, in addition to the above components, a vulcanization accelerator, zinc oxide and the like may be appropriately added and kneaded as needed.

3. Tire Manufacturing

The tire of the present disclosure is manufactured by a usual method using an unvulcanized rubber composition obtained through the finish kneading step. That is, the unvulcanized rubber composition is extruded according to each of the shapes of side wall and clinch portion, and is molded together with other tire members by a normal method on a tire molding machine to produce an unvulcanized tire.

Specifically, on the molded drum, the inner liner as a member to ensure the air-tightness of the tire, the carcass as a member to withstand the load, impact and filling air pressure received by the tire, the belt as a member to strongly tighten the carcass to increase the rigidity of the tread, and the like are wound, both ends of the carcass are fixed to both side edges, a bead part as a member for fixing the tire to the rim is arranged, and they are formed into a toroid shape. Then the tread is pasted on the center of the outer circumference, and a side portion (sidewall and clinch portion), as a member protecting the carcass and resisting bending, is pasted on the radially outside, and an unvulcanized tire is produced.

In the present embodiment, it is preferable to provide with an inclined belt layer that extends at an angle of 15° to 30° with respect to the tire circumferential direction, as the belt. As a result, the durability of the tire is ensured while the rigidity of the tread can be sufficiently maintained. Further, since it can be restrained in the circumferential direction, it becomes easy to suppress the growth of the outer diameter.

Then, the produced unvulcanized tire is heated and pressed in a vulcanizer to obtain a tire. The vulcanization step can be carried out by applying a known vulcanization means. The vulcanization temperature is, for example, higher than 120° C. and lower than 200° C., and the vulcanization time is, for example, more than 5 minutes and less than 15 minutes.

At this time, the tire is formed into a shape that satisfies the above-mentioned (formula 1) and (formula 2) when the tire is installed on a standardized rim and the internal pressure is set to 250 kPa.

Specific tires that can satisfy the above (formula 1) and (formula 2) include tires with size notation of 145/60R18, 145/60R19, 155/55R18, 155/55R19, 155/70R17, 155/70R19, 165/55R20, 165/55R21, 165/60R19, 165/65R19, 165/70R18, 175/55R19, 175/55R20, 175/55R22, 175/60R18, 185/55R19, 185/60R20, 195/50R20, 195/55R20, etc.

In the present embodiment, the tires that can satisfy (formula 1) and (formula 2) are preferably applied to pneumatic tires for passenger cars, and satisfying the above formulas can contribute more favorably to solve the problem in the present disclosure of providing a pneumatic tire with sufficiently reduced rolling resistance during high-speed running and excellent durability.

Examples

Hereinafter, the present disclosure will be described in more specific with reference to Examples.

[Experiment 1]

In this experiment, 175 size tires were prepared and evaluated.

1. Manufacture of Rubber Compositions for Forming Side Portion

A rubber composition for forming side portion was produced.

(1) Compounding Material

First, each compounding material shown below was prepared.

(a) Rubber component
(a-1) NR: TSR20
(a-2) BR-1: UBEPOL-BR150B manufactured by Ube Industries, Ltd. (cis content: 97% by mass)
(a-3) BR-2: Nipol-BR125011 manufactured by Nippon Zeon Co., Ltd. (tin terminal modified BR, cis content: 40% by mass)
(a-4) BR-3: UBEPOL VCR617 manufactured by Ube Industries, Ltd. (cis content: 98% by mass)
(b) Compounding materials other than rubber components
(b-1) Carbon black-1: Show Black N550 manufactured by Cabot Japan Co., Ltd. (DOP oil absorption: 115 ml/100 g)
(b-2) Carbon Black-2: Show Black N330T manufactured by Cabot Japan Co., Ltd. (DOP oil absorption: 104 ml/100 g)
(b-3) Oil: Process X-140 manufactured by Japan Energy Co., Ltd.
(b-4) Stearic acid: stearic acid "Tsubaki" manufactured by NOF Corporation
(b-5) Zinc oxide: zinc oxide No. 1 manufactured by Mitsui Mining & Smelting Co., Ltd.
(b-6) Wax: Sannok wax manufactured by Ouchi Shinko Chemical Industry Co., Ltd.
(b-7) Antiaging agent-1: Nocrac 6C manufactured by Ouchi Shinko Chemical Industry Co., Ltd. (N-phenyl-N'(1,3-dimethylbutyl)-p-phenylenediamine)
(b-8) Anti-aging agent-2: Antage RD manufactured by Kawaguchi Chemical Industry Co., Ltd. (2,2,4-trimethyl-1,2-dihydroquinoline)
(b-9) Cross-linking agent and vulcanization accelerator
  Sulfur: powdered sulfur manufactured by Tsurumi Chemical Industry Co., Ltd.
  Vulcanization accelerator: Nocceler NS manufactured by Ouchi Shinko Chemical Industry Co., Ltd. (N-tert-butyl-2-benzothiazolylsulfenamide)

(2) Production of Rubber Composition for Forming Side Portion

In accordance with the formulation shown in Table 1 (rubber composition for sidewall) and Table 2 (rubber composition for clinch portion), materials other than sulfur and the vulcanization accelerator were kneaded under the conditions of 150° C. for 5 minutes using a banbury mixer to obtain a kneaded product. Each compounding amount is a mass part.

Next, sulfur and a vulcanization accelerator were added to the obtained kneaded product, and the mixture was kneaded at 80° C. for 5 minutes using an open roll to obtain each of rubber compositions for forming side portion (a rubber composition for the side wall and a rubber composition for the clinch portion).

TABLE 1

| Formulation | A | B | C | D | E |
| --- | --- | --- | --- | --- | --- |
| NR | 40 | 40 | 40 | 40 | 40 |
| BR-1 | 60 | 60 | 60 | | |
| BR-2 | | | | 30 | 30 |
| BR-3 | | | | 30 | 30 |
| Carbon black-1 | 60 | 75 | 65 | 45 | 40 |
| Oil | 15 | 25 | 15 | 15 | 10 |
| Stearic acid | 3 | 3 | 3 | 3 | 3 |
| Zinc oxide | 4.5 | 4.5 | 4.5 | 4.5 | 4.5 |
| Wax | 2 | 2 | 2 | 2 | 2 |
| Anti-aging agent-1 | 4.5 | 4.5 | 4.5 | 4.5 | 4.5 |
| Anti-aging agent-2 | 2 | 2 | 2 | 2 | 2 |
| Sulfur | 1.9 | 1.9 | 1.9 | 1.9 | 1.9 |
| Vulcanization accelerator | 0.9 | 1.4 | 1.2 | 1.2 | 1.4 |
| E* | 3.2 | 6.5 | 6.7 | 4.0 | 4.5 |
| tan δ | 0.20 | 0.19 | 0.15 | 0.08 | 0.06 |

TABLE 2

| Formulation | a | b | c |
|---|---|---|---|
| NR | 40 | 40 | 30 |
| BR-1 | 60 | 60 | |
| BR-2 | | | 35 |
| BR-3 | | | 35 |
| Carbon black-2 | 75 | 65 | 55 |
| Oil | 15 | 20 | 13 |
| Stearic acid | 3 | 3 | 3 |
| Zinc oxide | 4.5 | 4.5 | 4.5 |
| Wax | 1.5 | 1.5 | 1.5 |
| Anti-aging agent-1 | 2 | 2 | 2 |
| Anti-aging agent-2 | 2 | 2 | 2 |
| Sulfur | 2.8 | 2.8 | 2.8 |
| Vulcanization accelerator | 3 | 3.5 | 3 |
| E* | 12 | 13.2 | 9.5 |
| tan δ | 0.12 | 0.09 | 0.08 |

2. Tire Manufacturing

Using each of the obtained rubber composition, a sidewall and a clinch portion having a predetermined shape are formed, and were pasted together with other tire members in the combinations shown in Tables 3 and 4 to form an unvulcanized tire. Then, the unvulcanized tire was press-vulcanized for 10 minutes under the condition of 170° C. to produce each test tire having a size of 175 type (Example 1-1 to Example 1-5 and Comparative example 1-1 to Comparative example 1-7).

3. Parameter Calculation

Thereafter, for each test tire, sidewall thickness S (mm), the outer diameter Dt (mm), the cross-sectional width Wt (mm), the cross-sectional height Ht (mm), and the aspect ratio (%) were obtained, and the virtual volume V (mm³) was calculated. The results are shown in Tables 3 and 4.

At the same time, a rubber test piece for viscoelasticity measurement was produced by cutting out from the each rubber layer of the side portion (sidewall and clinch portion) of each test tire in a length 20 mm×width 4 mm×thickness 2 mm so that the tire circumferential direction was the long side. Then, for each rubber test piece, tan δ (tan δsw, tan δc) and E*(E*sw, E*c) were measured under the conditions of 70° C., frequency of 10 Hz, initial strain of 5%, and dynamic strain of 1% using an Eplexor series manufactured by GABO Co., Ltd. The thickness direction of the sample was the tire radial direction. The results are shown in Tables 1 and 2 as well as Tables 3 and 4.

Then, tan δsw+tan δc, |tan δsw−tan δc|, (E*c−E*sw), |Bsw−Bc|, (Dt−2×Ht), (Dt²×π/4)/Wt, (V+1.5×10⁷)/Wt, (V+2.0×10⁷)/Wt, (V+2.5×10⁷)/Wt, and (tan δsw+tan δc)× V/Wt were calculated. The results are shown in Tables 3 and 4.

5. Performance Evaluation Test (1) Evaluation of Rolling Resistance at High-Speed Running Each test tire was installed on all wheels of the vehicle (domestic FF vehicle, displacement 2000 cc), filled with air so that the internal pressure became 250 kPa, and then driven on a dry road surface test course at a speed of 100 km/h. After making a 10 km lap, the accelerator was released, and the distance from when the accelerator was turned off until the vehicle stopped was measured as the rolling resistance at high-speed running.

Next, the result in Comparative example 1-7 was set to as 100, and the results were indexed based on the following formula to relatively evaluate the rolling resistance at high-speed running. The larger the value, the longer the distance from when the accelerator is turned off until the vehicle stops and the smaller the rolling resistance in the steady state, and showing excellent fuel efficiency.

Rolling resistance=[(Result of test tire)/(Result of Comparative example 1-7)]×100

(2) Evaluation of Durability Performance

After installing each test tire on all wheels of the vehicle (domestic FF vehicle, displacement 2000 cc) and filling it with air so that the internal pressure becomes 250 kPa, a driving 10 laps at a speed of 50 km/h, followed by climbing onto the unevenness provided on the road surface at a speed of 80 km/h was repeated on the test course on a dry road surface in an overloaded state. Thereafter, the lap was performed again at a speed of 50 km/h and then the speed was gradually increased to measure the speed at the time when the driver felt an abnormality.

Next, the result in Comparative example 1-7 was set to as 100, and the durability performance was relatively evaluated by indexing based on the following formula. The larger the value, the better the durability.

Durability=[(Result of test tire)/(Result of Comparative example 1-7)]×100

(3) Comprehensive Evaluation

The evaluation results of (1) and (2) above were totaled to obtain a comprehensive evaluation.

(4) Evaluation Result

The results of each evaluation are shown in Tables 3 and 4.

TABLE 3

| | Example No. | | | | |
|---|---|---|---|---|---|
| | 1-1 | 1-2 | 1-3 | 1-4 | 1-5 |
| SIZE | 175/40R21 | 175/40R21 | 175/40R21 | 175/50R20 | 175/60R19 |
| Formulation for sidewall | C | C | D | C | C |
| Formulation for clinch portion | a | c | c | a | a |
| (Parameter) | | | | | |
| tan δ sw | 0.15 | 0.15 | 0.08 | 0.15 | 0.15 |
| tan δ c | 0.12 | 0.08 | 0.08 | 0.12 | 0.12 |
| E*sw (MPa) | 6.7 | 6.7 | 4.0 | 6.7 | 6.7 |
| E*c (MPa) | 12.0 | 9.5 | 9.5 | 12.0 | 12.0 |
| Bsw (parts by mass) | 60 | 60 | 60 | 60 | 60 |
| Bc (parts by mass) | 60 | 70 | 70 | 60 | 60 |
| Dt (mm) | 674 | 673 | 672 | 684 | 692 |
| V (mm³) | 23377471 | 23206160 | 23136067 | 29823416 | 34466507 |

TABLE 3-continued

|  | Example No. | | | | |
| --- | --- | --- | --- | --- | --- |
|  | 1-1 | 1-2 | 1-3 | 1-4 | 1-5 |
| Wt (mm) | 176 | 175 | 177 | 181 | 178 |
| Ht(mm) | 70 | 70 | 69 | 88 | 105 |
| Dt − 2 × Ht(mm) | 534 | 533 | 534 | 508 | 482 |
| S (mm) | 1.9 | 1.8 | 1.7 | 2.1 | 2.1 |
| T: tan $\delta$sw + tan $\delta$c | 0.27 | 0.23 | 0.16 | 0.27 | 0.27 |
| \| tan $\delta$sw − tan $\delta$c \| | 0.03 | 0.07 | 0.00 | 0.03 | 0.03 |
| ($Dt^2 \times \pi/4$)/Wt | 2027 | 2033 | 2004 | 2030 | 2113 |
| (V + 1.5 × $10^7$)/Wt | 218054 | 218321 | 215458 | 247643 | 277902 |
| (E* c − E* sw) | 5.3 | 2.8 | 5.5 | 5.3 | 5.3 |
| (V + 2.0 × $10^7$)/Wt | 246463 | 246892 | 243707 | 275267 | 305992 |
| (V + 2.5 × $10^7$)/Wt | 274872 | 275464 | 271955 | 302892 | 334082 |
| Aspect ratio (%) | 40 | 40 | 39 | 49 | 59 |
| \| Bsw − Bc \| | 0 | 10 | 10 | 0 | 0 |
| T × V/Wt | 35863 | 30500 | 20914 | 44488 | 52281 |
| (Evaluation result) | | | | | |
| Rolling resistance at high-speed running | 110 | 118 | 128 | 114 | 114 |
| Durability | 124 | 128 | 138 | 118 | 112 |
| Comprehensive evaluation | 234 | 246 | 266 | 232 | 226 |

TABLE 4

|  | Comparative example No. | | | | | | |
| --- | --- | --- | --- | --- | --- | --- | --- |
|  | 1-1 | 1-2 | 1-3 | 1-4 | 1-5 | 1-6 | 1-7 |
| SIZE | 175/80R14 | 175/60R19 | 175/80R14 | 175/80R14 | 175/80R14 | 175/80R14 | 175/80R14 |
| Formulation for sidewall | A | A | A | B | C | C | D |
| Formulation for clinch portion | a | a | b | a | a | c | c |
| (Parameter) | | | | | | | |
| tan $\delta$ sw | 0.20 | 0.20 | 0.20 | 0.19 | 0.15 | 0.15 | 0.08 |
| tan $\delta$ c | 0.12 | 0.12 | 0.09 | 0.12 | 0.12 | 0.08 | 0.08 |
| E*sw (MPa) | 3.2 | 3.2 | 3.2 | 6.5 | 6.7 | 6.7 | 4.0 |
| E*c (MPa) | 12.0 | 12.0 | 13.2 | 12.0 | 12.0 | 9.5 | 9.5 |
| Bsw (parts by mass) | 60 | 60 | 60 | 60 | 60 | 60 | 60 |
| Bc (parts by mass) | 60 | 60 | 60 | 60 | 60 | 70 | 70 |
| Dt (mm) | 636 | 693 | 635 | 637 | 636 | 635 | 636 |
| V ($mm^3$) | 38612938 | 34331262 | 38317377 | 38669035 | 38612938 | 38752802 | 38612938 |
| Wt (mm) | 177 | 177 | 176 | 176 | 177 | 178 | 177 |
| Ht(mm) | 140 | 105 | 140 | 141 | 140 | 140 | 140 |
| Dt − 2 × Ht(mm) | 356 | 483 | 355 | 355 | 356 | 355 | 356 |
| S (mm) | 1.9 | 2.0 | 2.1 | 1.8 | 1.9 | 2.0 | 1.8 |
| T: tan $\delta$sw + tan $\delta$c | 0.32 | 0.32 | 0.29 | 0.31 | 0.27 | 0.23 | 0.16 |
| \| tan $\delta$sw − tan $\delta$c \| | 0.08 | 0.08 | 0.11 | 0.07 | 0.03 | 0.07 | 0.00 |
| ($Dt^2 \times \pi/4$)/Wt | 1795 | 2131 | 1799 | 1811 | 1795 | 1779 | 1795 |
| (V + 1.5 × $10^7$)/Wt | 302898 | 278708 | 302940 | 304938 | 302898 | 301982 | 302898 |
| (E* c − E* sw) | 8.8 | 8.8 | 10.0 | 5.5 | 5.3 | 2.8 | 5.5 |
| (V + 2.0 × $10^7$)/Wt | 331147 | 306956 | 331349 | 333347 | 331147 | 330072 | 331147 |
| (V + 2.5 × $10^7$)/Wt | 359395 | 335205 | 359758 | 361756 | 359395 | 358162 | 359395 |
| Aspect ratio (%) | 79 | 59 | 80 | 80 | 79 | 79 | 79 |
| \| Bsw − Bc \| | 0 | 0 | 0 | 0 | 0 | 10 | 10 |
| T × V/Wt | 69809 | 62068 | 63137 | 68110 | 58901 | 50074 | 34904 |
| (Evaluation result) | | | | | | | |
| Rolling resistance at high-speed running | 88 | 92 | 90 | 92 | 96 | 97 | 100 |
| Durability | 74 | 79 | 83 | 85 | 87 | 97 | 100 |
| Comprehensive evaluation | 162 | 170 | 173 | 177 | 183 | 194 | 200 |

[Experiment 2]
In this Experiment, 195 Size Tires were Prepared and Evaluated.

After producing the test tires of Examples 2-1 to 2-5 and Comparative examples 2-1 to 2-7 shown in Tables 5 and 6 in the same manner as in Experiment 1, each parameter was calculated by performing the same procedure. Then, in the same manner, a performance evaluation test was conducted and evaluated. In this experiment, the result in Comparative example 2-7 was set as 100 for evaluation. The results of each evaluation are shown in Tables 5 and 6.

TABLE 5

| | Example No. | | | | |
|---|---|---|---|---|---|
| | 2-1 | 2-2 | 2-3 | 2-4 | 2-5 |
| SIZE | 195/40R20 | 195/40R20 | 195/40R20 | 195/50R19 | 195/60R18 |
| Formulation for sidewall | C | C | D | C | C |
| Formulation for clinch portion | a | c | c | a | a |
| (Parameter) | | | | | |
| $\tan \delta$ sw | 0.15 | 0.15 | 0.08 | 0.15 | 0.15 |
| $\tan \delta$ c | 0.12 | 0.08 | 0.08 | 0.12 | 0.12 |
| $E^*$sw (MPa) | 6.7 | 6.7 | 4.0 | 6.7 | 6.7 |
| $E^*$c (MPa) | 12.0 | 9.5 | 9.5 | 12.0 | 12.0 |
| Bsw (parts by mass) | 60 | 60 | 60 | 60 | 60 |
| Bc (parts by mass) | 60 | 70 | 70 | 60 | 60 |
| Dt (mm) | 663 | 665 | 664 | 680 | 690 |
| V (mm$^3$) | 28813525 | 29087378 | 28575587 | 36140254 | 42045141 |
| Wt (mm) | 201 | 200 | 199 | 200 | 201 |
| Ht (mm) | 78 | 79 | 78 | 99 | 116 |
| Dt − 2 × Ht (mm) | 507 | 507 | 508 | 482 | 458 |
| S (mm) | 2.3 | 2.1 | 1.9 | 2.1 | 2.0 |
| T: $\tan \delta$sw + $\tan \delta$c | 0.27 | 0.23 | 0.16 | 0.27 | 0.27 |
| \| $\tan \delta$sw − $\tan \delta$c \| | 0.03 | 0.07 | 0.00 | 0.03 | 0.03 |
| (Dt$^2$ × π/4)/Wt | 1718 | 1737 | 1740 | 1816 | 1860 |
| (V + 1.5 × 10$^7$)/Wt | 217978 | 220437 | 218973 | 255701 | 283807 |
| ($E^*$c − $E^*$sw) | 5.3 | 2.8 | 5.5 | 5.3 | 5.3 |
| (V + 2.0 × 10$^7$)/Wt | 242853 | 245437 | 244098 | 280701 | 308682 |
| (V + 2.5 × 10$^7$)/Wt | 267729 | 270437 | 269224 | 305701 | 333558 |
| Aspect ratio (%) | 39 | 40 | 39 | 50 | 58 |
| \| Bsw − Bc \| | 0 | 10 | 10 | 0 | 0 |
| T × V/Wt | 38705 | 33450 | 22975 | 48789 | 56479 |
| (Evaluation result) | | | | | |
| Rolling resistance at high-speed running | 105 | 115 | 126 | 110 | 114 |
| Durability | 122 | 126 | 134 | 118 | 110 |
| Comprehensive evaluation | 227 | 241 | 260 | 228 | 224 |

TABLE 6

| | Comparative example No. | | | | | | |
|---|---|---|---|---|---|---|---|
| | 2-1 | 2-2 | 2-3 | 2-4 | 2-5 | 2-6 | 2-7 |
| SIZE | 195/65R17 | 195/40R20 | 195/65R17 | 195/65R17 | 195/65R17 | 195/65R17 | 195/65R17 |
| Formulation for sidewall | A | A | A | B | C | C | D |
| Formulation for clinch portion | a | a | b | a | a | c | c |
| (Parameter) | | | | | | | |
| $\tan \delta$ sw | 0.20 | 0.20 | 0.20 | 0.19 | 0.15 | 0.15 | 0.08 |
| $\tan \delta$ c | 0.12 | 0.12 | 0.09 | 0.12 | 0.12 | 0.08 | 0.08 |
| $E^*$sw (MPa) | 3.2 | 3.2 | 3.2 | 6.5 | 6.7 | 6.7 | 4.0 |
| $E^*$c (MPa) | 12.0 | 12.0 | 13.2 | 12.0 | 12.0 | 9.5 | 9.5 |
| Bsw (parts by mass) | 60 | 60 | 60 | 60 | 60 | 60 | 60 |
| Bc (parts by mass) | 60 | 60 | 60 | 60 | 60 | 70 | 70 |
| Dt (mm) | 685 | 665 | 686 | 687 | 687 | 686 | 685 |
| V (mm$^3$) | 44971685 | 28941941 | 44606217 | 45407022 | 45182235 | 44606217 | 44526421 |
| Wt (mm) | 202 | 199 | 200 | 202 | 201 | 200 | 200 |
| Ht (mm) | 127 | 79 | 127 | 128 | 128 | 127 | 127 |
| Dt − 2 × Ht (mm) | 431 | 507 | 432 | 431 | 431 | 432 | 431 |
| S (mm) | 2.2 | 2.1 | 2.3 | 2.0 | 1.9 | 2.0 | 2.0 |
| T: $\tan \delta$sw + $\tan \delta$c | 0.32 | 0.32 | 0.29 | 0.31 | 0.27 | 0.23 | 0.16 |
| \| $\tan \delta$sw − $\tan \delta$c \| | 0.08 | 0.08 | 0.11 | 0.07 | 0.03 | 0.07 | 0.00 |
| (Dt$^2$ × π/4)/Wt | 1824 | 1745 | 1848 | 1835 | 1844 | 1848 | 1843 |
| (V + 1.5 × 10$^7$)/Wt | 296890 | 220814 | 298045 | 299045 | 299414 | 298031 | 297632 |
| ($E^*$c − $E^*$sw) | 8.8 | 8.8 | 10.0 | 5.5 | 5.3 | 2.8 | 5.5 |
| (V + 2.0 × 10$^7$)/Wt | 321642 | 245939 | 323031 | 323797 | 324290 | 323031 | 322632 |
| (V + 2.5 × 10$^7$)/Wt | 346394 | 271065 | 348031 | 348550 | 349165 | 348031 | 347632 |
| Aspect ratio (%) | 63 | 40 | 64 | 63 | 64 | 64 | 64 |
| \| Bsw − Bc \| | 0 | 0 | 0 | 0 | 0 | 10 | 10 |
| T × V/Wt | 71242 | 46540 | 64679 | 69684 | 60693 | 51297 | 35621 |
| (Evaluation result) | | | | | | | |
| Rolling resistance at high-speed running | 88 | 90 | 88 | 80 | 96 | 98 | 100 |
| Durability | 74 | 80 | 82 | 84 | 86 | 98 | 100 |
| Comprehensive evaluation | 162 | 170 | 170 | 164 | 182 | 196 | 200 |

[Experiment 3]

In this experiment, 225 size tires were prepared and evaluated.

After producing the test tires of Examples 3-1 to 3-5 and Comparative examples 3-1 to 3-7 shown in Tables 7 and 8 in the same manner as in Experiment 1, each parameter was calculated by performing the same procedure. Then, in the same manner, a performance evaluation test was conducted and evaluated. In this experiment, the result in Comparative example 3-7 was set as 100 for evaluation. The results of each evaluation are shown in Tables 7 and 8.

TABLE 7

| | Example No. | | | | |
|---|---|---|---|---|---|
| | 3-1 | 3-2 | 3-3 | 3-4 | 3-5 |
| SIZE | 225/35R22 | 225/35R22 | 225/35R22 | 225/50R20 | 225/40R21 |
| Formulation for sidewall | C | C | D | C | C |
| Formulation for clinch portion | a | c | c | a | a |
| (Parameter) | | | | | |
| $\tan \delta$ sw | 0.15 | 0.15 | 0.08 | 0.15 | 0.15 |
| $\tan \delta$ c | 0.12 | 0.08 | 0.08 | 0.12 | 0.12 |
| E*sw (MPa) | 6.7 | 6.7 | 4.0 | 6.7 | 6.7 |
| E*c (MPa) | 12.0 | 9.5 | 9.5 | 12.0 | 12.0 |
| Bsw (parts by mass) | 60 | 60 | 60 | 60 | 60 |
| Bc (parts by mass) | 60 | 70 | 70 | 60 | 60 |
| Dt (mm) | 718 | 716 | 717 | 733 | 714 |
| V (mm$^3$) | 37040131 | 36203610 | 36260445 | 51283296 | 40755756 |
| Wt (mm) | 231 | 229 | 229 | 233 | 231 |
| Ht(mm) | 80 | 79 | 79 | 113 | 90 |
| Dt − 2 × Ht(mm) | 558 | 558 | 559 | 507 | 534 |
| S (mm) | 2.5 | 2.3 | 2.2 | 2.3 | 2.4 |
| T: $\tan \delta$sw + $\tan \delta$c | 0.27 | 0.23 | 0.16 | 0.27 | 0.27 |
| \| $\tan \delta$sw − $\tan \delta$c \| | 0.03 | 0.07 | 0.00 | 0.03 | 0.03 |
| (Dt$^2$ × π/4)/Wt | 1753 | 1758 | 1763 | 1811 | 1733 |
| (V + 1.5 × 10$^7$)/Wt | 225282 | 223597 | 223845 | 284478 | 241367 |
| (E* c − E* sw) | 5.3 | 2.8 | 5.5 | 5.3 | 5.3 |
| (V + 2.0 × 10$^7$)/Wt | 246927 | 245431 | 245679 | 305937 | 263012 |
| (V + 2.5 × 10$^7$)/Wt | 268572 | 267265 | 267513 | 327396 | 284657 |
| Aspect ratio (%) | 35 | 34 | 34 | 48 | 39 |
| \| Bsw − Bc \| | 0 | 10 | 10 | 0 | 0 |
| T × V/Wt | 43294 | 36362 | 25335 | 59427 | 47637 |
| (Evaluation result) | | | | | |
| Rolling resistance at high-speed running | 106 | 120 | 128 | 112 | 120 |
| Durability | 128 | 134 | 133 | 120 | 116 |
| Comprehensive evaluation | 234 | 254 | 261 | 232 | 236 |

TABLE 8

| | Comparative example No. | | | | | | |
|---|---|---|---|---|---|---|---|
| | 3-1 | 3-2 | 3-3 | 3-4 | 3-5 | 3-6 | 3-7 |
| SIZE | 225/60R20 | 225/50R20 | 225/60R20 | 225/60R20 | 225/60R20 | 225/60R20 | 225/60R20 |
| Formulation for sidewall | A | A | A | B | C | C | D |
| Formulation for clinch portion | a | a | b | a | a | c | c |
| (Parameter) | | | | | | | |
| $\tan \delta$ sw | 0.20 | 0.20 | 0.20 | 0.19 | 0.15 | 0.15 | 0.08 |
| $\tan \delta$ c | 0.12 | 0.12 | 0.09 | 0.12 | 0.12 | 0.08 | 0.08 |
| E*sw (MPa) | 3.2 | 3.2 | 3.2 | 6.5 | 6.7 | 6.7 | 4.0 |
| E*c (MPa) | 12.0 | 12.0 | 13.2 | 12.0 | 12.0 | 9.5 | 9.5 |
| Bsw (parts by mass) | 60 | 60 | 60 | 60 | 60 | 60 | 60 |
| Bc (parts by mass) | 60 | 60 | 60 | 60 | 60 | 70 | 70 |
| Dt (mm) | 777 | 734 | 778 | 779 | 778 | 777 | 779 |
| V (mm$^3$) | 62352540 | 51586466 | 62176957 | 62362801 | 62449663 | 62080258 | 62637527 |
| Wt (mm) | 229 | 234 | 228 | 227 | 229 | 228 | 228 |
| Ht(mm) | 135 | 113 | 135 | 136 | 135 | 135 | 136 |
| Dt − 2 × Ht(mm) | 507 | 508 | 508 | 507 | 508 | 507 | 507 |
| S (mm) | 2.4 | 2.3 | 2.4 | 2.3 | 2.4 | 2.2 | 2.1 |
| T: $\tan \delta$sw + $\tan \delta$c | 0.32 | 0.32 | 0.29 | 0.31 | 0.27 | 0.23 | 0.16 |
| \| $\tan \delta$sw − $\tan \delta$c \| | 0.08 | 0.08 | 0.11 | 0.07 | 0.03 | 0.07 | 0.00 |
| (Dt$^2$ × π/4)/Wt | 2071 | 1808 | 2085 | 2100 | 2076 | 2080 | 2090 |
| (V + 1.5 × 10$^7$)/Wt | 337784 | 284558 | 338495 | 340805 | 338208 | 338071 | 340515 |
| (E* c − E* sw) | 8.8 | 8.8 | 10.0 | 5.5 | 5.3 | 2.8 | 5.5 |
| (V + 2.0 × 10$^7$)/Wt | 359618 | 305925 | 360425 | 362832 | 360042 | 360001 | 362445 |
| (V + 2.5 × 10$^7$)/Wt | 381452 | 327293 | 382355 | 384858 | 381876 | 381931 | 384375 |

TABLE 8-continued

| | Comparative example No. | | | | | | |
|---|---|---|---|---|---|---|---|
| | 3-1 | 3-2 | 3-3 | 3-4 | 3-5 | 3-6 | 3-7 |
| Aspect ratio (%) | 59 | 48 | 59 | 60 | 59 | 59 | 60 |
| \| Bsw − Bc \| | 0 | 0 | 0 | 0 | 0 | 10 | 10 |
| T × V/Wt | 87130 | 70546 | 79085 | 85165 | 73631 | 62625 | 43956 |
| | (Evaluation result) | | | | | | |
| Rolling resistance at high-speed running | 90 | 94 | 88 | 94 | 92 | 94 | 100 |
| Durability | 70 | 80 | 82 | 84 | 88 | 96 | 100 |
| Comprehensive evaluation | 160 | 174 | 170 | 178 | 180 | 190 | 200 |

[Summary of Experiments 1 to 3]

From the results of Experiments 1 to 3 (Tables 3 to 8), for tires of any size, 175 size, 195 size, 225 size, it turns out that it is possible to provide a pneumatic tire with reduced rolling resistance at high-speed running and excellent durability, when the above (formula 1) and (formula 2) are satisfied, and further (tan δsw+tan δc)≤0.3 and |tan δsw−tan δc|≤0.07.

Then, it turns out that, by satisfying each of the requirements specified in claim 2 and thereafter, it is possible to provide a tire with further improved rolling resistance and durability performance at high-speed running.

On the other hand, it turns out that when any of above-mentioned (formula 1), (formula 2), (tan δsw+tan δc)≤0.3 and |tan δsw−tan δc|≤0.07 is not satisfied, the reduced rolling resistance at high-speed running and the excellent durability performance are not sufficiently achieved.

[Experiment 4]

Next, three types of tires (Examples 4-1 to 4-3), in which the relationship between the virtual volume V and the cross-sectional width Wt did not differ significantly, were produced with the same formulation and were evaluated in the same manner with setting the results in Example 4-3 to 100. Here, in addition to the above mentioned evaluation of rolling resistance during high-speed running and chipping resistance, the ride comfort was also evaluated.

Specifically, each test tire was installed on all wheels of the vehicle (domestic FF vehicle, displacement 2000 cc), filled with air so that the internal pressure became 250 kPa, and then driven on a dry road surface test course. The driver sensory-tested the ride comfort on a 5-point scale when the vehicle has driven 10 km at a speed of 100 km/h. After summing up the evaluations by 20 drivers, the evaluation was indexed based on the following formula, with the total score in Example 4-3 being set to 100, and the riding comfort was relatively evaluated. A larger value indicates better riding comfort.

Ride comfort=[(Total evaluation score of test tire)/(Total evaluation score of Example 4-3)]×100

Then, as in Experiments 1 to 3, each evaluation result was totaled to obtain a comprehensive evaluation. Table 9 shows the results of each evaluation.

TABLE 9

| | Example No. | | |
|---|---|---|---|
| | 4-1 | 4-2 | 4-3 |
| SIZE | 175/55R18 | 195/50R19 | 225/45R20 |
| Formulation for sidewall | E | E | E |
| Formulation for clinch portion | c | c | c |

TABLE 9-continued

| | Example No. | | |
|---|---|---|---|
| | 4-1 | 4-2 | 4-3 |
| | (Parameter) | | |
| tan δ sw | 0.06 | 0.06 | 0.06 |
| tan δ c | 0.08 | 0.08 | 0.08 |
| E*sw (MPa) | 4.5 | 4.5 | 4.5 |
| E*c (MPa) | 9.5 | 9.5 | 9.5 |
| Bsw (parts by mass) | 60 | 60 | 60 |
| Bc (parts by mass) | 70 | 70 | 70 |
| Dt (mm) | 649 | 679 | 710 |
| V (mm$^3$) | 30327983 | 36015050 | 43478150 |
| Wt (mm) | 182 | 201 | 225 |
| Ht(mm) | 96 | 98 | 101 |
| Dt − 2 × Ht(mm) | 457 | 483 | 508 |
| S (mm) | 1.6 | 1.8 | 2.0 |
| T: tan δsw + tan δc | 0.14 | 0.14 | 0.14 |
| \| tan δsw − tan δc \| | 0.02 | 0.02 | 0.02 |
| (Dt$^2$ × π/4)/Wt | 1818 | 1801 | 1760 |
| (V + 1.5 × 10$^7$)/Wt | 249055 | 253806 | 259903 |
| (E*c − E*sw) | 5.0 | 5.0 | 5.0 |
| (V + 2.0 × 10$^7$)/Wt | 276527 | 278682 | 282125 |
| (V + 2.5 × 10$^7$)/Wt | 304000 | 303557 | 304347 |
| Aspect ratio (%) | 53 | 49 | 45 |
| \| Bsw − Bc \| | 10 | 10 | 10 |
| T × V/Wt | 23329 | 25085 | 27053 |
| | (Evaluation result) | | |
| Rolling resistance at high-speed running | 108 | 104 | 100 |
| Durability | 116 | 110 | 100 |
| Ride confort | 108 | 104 | 100 |
| Comprehensive evaluation | 332 | 318 | 300 |

Table 9 shows that, when there is no large difference in the relationship between the virtual volume V and the cross-sectional width Wt, all the rolling resistance at high-speed running, the chipping resistance and the ride comfort are improved, as the cross-sectional width Wt becomes smaller as from less than 205 mm to less than 200 mm, and as the aspect ratio increases.

Although the present disclosure has been described above based on the embodiments, the present disclosure is not limited to the above embodiments. Various modifications can be made to the above embodiments within the same and equal range as the present disclosure.

The present disclosure (1) is;
a pneumatic tire having a sidewall and a clinch portion on each of a pair of side portions, wherein
(tan δsw+tan δc)≤0.3 and |tan δsw−tan δc|≤0.07 are satisfied, where tan δsw is the loss tangent of the sidewall and tan δc is the loss tangent of the clinch portion, measured under the conditions of 70° C., frequency of 10 Hz, initial strain of 5%, and dynamic strain rate of 1%; and when the cross-sectional width of the tire is Wt (mm), the outer diameter is Dt (mm), and the volume of the space occupied by the tire is the virtual volume V (mm³), when the tire is installed on a standardized rim and the internal pressure is 250 kPa, the tire satisfies following (formula 1) and (formula 2):

$$1700 \leq (Dt^2 \times \pi/4)/Wt \leq 2827.4 \quad \text{(formula 1)}$$

$$[(V+1.5\times10^7)/Wt] \leq 2.88\times10^5 \quad \text{(formula 2)}.$$

The present disclosure (2) is the pneumatic tire according to the present disclosure (1), wherein (E*c−E*sw)≤8.0, where the complex elastic modulus of the sidewall is E*sw (MPa) and the complex elastic modulus of the clinch portion is E*c (MPa), measured under the conditions of 70° C., frequency of 10 Hz, initial strain of 5%, and dynamic strain rate of 1%.

The present disclosure (3) is the pneumatic tire according to the present disclosure (1) or (2), wherein the following (formula 3) is satisfied.

$$[(V+2.0\times10^7)/Wt] \leq 2.88\times10^5 \quad \text{(formula 3)}$$

The present disclosure (4) is the pneumatic tire according to the present disclosure (3), wherein the following (formula 4) is satisfied.

$$[(V+2.5\times10^7)/Wt] \leq 2.88\times10^5 \quad \text{(formula 4)}$$

The present disclosure (5) is the pneumatic tire of any combination of the present disclosures (1) to (4), wherein, when the outer diameter of the tire is Dt (mm) and the cross-sectional height of the tire is Ht (mm) when the tire is installed on a standardized rim and the internal pressure is 250 kPa, (Dt−2×Ht) is 470 (mm) or more.

The present disclosure (6) is the pneumatic tire of any combination of the present disclosures (1) to (5), which has an aspect ratio of 40% or more.

The present disclosure (7) is the pneumatic tire according to the present disclosure (6), which has an aspect ratio of 45% or more.

The present disclosure (8) is the pneumatic tire according to the present disclosure (7), which has an aspect ratio of 47.5% or more.

The present disclosure (9) is the pneumatic tire according to the present disclosure (8), which has an aspect ratio of 50% or more.

The present disclosure (10) is the pneumatic tire of any combination of the present disclosures (1) to (9), wherein
each of the sidewall and the clinch portion contains butadiene rubber as a rubber component, and
when the content of the butadiene rubber in the sidewall is Bsw (parts by mass), and the content of the butadiene rubber in the clinch portion is Bc (parts by mass), the following (formula 5) is satisfied:

$$10 \leq |Bsw-Bc| \leq 40 \quad \text{(formula 5)}.$$

The present disclosure (11) is the pneumatic tire of any combination of the present disclosures (1) to (10), wherein the following (formula 6) is satisfied:

$$(\tan \delta sw + \tan \delta c) \times V/Wt \leq 50000 \quad \text{(formula 6)}$$

The present disclosure (12) is the pneumatic tire according to the present disclosure (11), wherein the following (formula 7) is satisfied:

$$(\tan \delta sw + \tan \delta c) \times V/Wt \leq 45000 \quad \text{(formula 7)}$$

The present disclosure (13) is the pneumatic tire of any combination of the present disclosures (1) to (12), wherein Dt is less than 685 (mm), where Dt (mm) is the outer diameter of the tire when the tire is installed on a standardized rim and the internal pressure is 250 kPa.

The present disclosure (14) is the pneumatic tire of any combination of the present disclosures (1) to (13), wherein the cross-sectional width Wt (mm) is less than 205 mm.

The present disclosure (15) is the pneumatic tire according to the present disclosure (14), wherein the cross-sectional width Wt (mm) is less than 200 mm.

The present disclosure (16) is the pneumatic tire of any combination of the present disclosures (1) to (15), wherein the thickness S (mm) of the sidewall in the tire width direction at the maximum width of the tire is 2.0 mm or less.

The present disclosure (17) is the pneumatic tire according to the present disclosure (16), wherein the thickness S (mm) of the sidewall in the tire width direction is 1.7 mm or less.

The present disclosure (18) is the pneumatic tire of any combination of the present disclosures (1) to (17), wherein (tan δsw+tan δc)<0.17 is satisfied.

The present disclosure (19) is the pneumatic tire of any combination of the present disclosures (1) to (18), which is a pneumatic tire for a passenger car.

What is claimed is:

1. A pneumatic tire having a sidewall and a clinch portion on each of a pair of side portions, wherein
   (tan δsw+tan δc)≤0.3 and |tan δsw−tan δc|≤0.07 are satisfied, where tan δsw is the loss tangent of the sidewall and tan δc is the loss tangent of the clinch portion, measured under the conditions of 70° C., frequency of 10 Hz, initial strain of 5%, and dynamic strain rate of 1%; and
   when the cross-sectional width of the tire is Wt (mm), the outer diameter is Dt (mm), and the volume of the space occupied by the tire is the virtual volume V (mm³), when the tire is installed on a standardized rim and the internal pressure is 250 kPa, the tire satisfies following (formula 1) and (formula 4):

$$1700 \leq (Dt^2 \times \pi/4)/Wt \leq 2827.4 \quad \text{(formula 1)}$$

$$[(V+2.5\times10^7)/Wt] \leq 2.75\times10^5 \quad \text{(formula 4)}.$$

2. The pneumatic tire according to claim 1, wherein (E*c−E*sw)≤8.0, where the complex elastic modulus of the sidewall is E*sw (MPa) and the complex elastic modulus of the clinch portion is E*c (MPa), measured under the conditions of 70° C., frequency of 10 Hz, initial strain of 5%, and dynamic strain rate of 1%.

3. The pneumatic tire according to claim 1, wherein, when the outer diameter of the tire is Dt (mm) and the cross-sectional height of the tire is Ht (mm) when the tire is installed on a standardized rim and the internal pressure is 250 kPa, (Dt−2×Ht) is 470 (mm) or more.

4. The pneumatic tire according to claim 1, wherein each of the sidewall and the clinch portion contains butadiene rubber as a rubber component, and
   when the content of the butadiene rubber in the sidewall is Bsw (parts by mass), and the content of the butadiene rubber in the clinch portion is Bc (parts by mass), the following (formula 5) is satisfied:

$$10 \leq |Bsw-Bc| \leq 40 \quad \text{(formula 5)}.$$

5. The pneumatic tire according to claim 1, wherein Dt is less than 685 (mm), where Dt (mm) is the outer diameter of the tire when the tire is installed on a standardized rim and the internal pressure is 250 kPa.

6. The pneumatic tire according to claim 1, wherein (tan δsw+tan δc)<0.17 is satisfied.

7. The pneumatic tire according to claim 1, which is a pneumatic tire for a passenger car.

8. The pneumatic tire according to claim 1, wherein the following (formula 6) is satisfied:

$$(\tan \delta sw + \tan \delta c) \times V/Wt \leq 50000 \quad \text{(formula 6)}.$$

9. The pneumatic tire according to claim 8, wherein the following (formula 7) is satisfied:

$$(\tan \delta sw + \tan \delta c) \times V/Wt \leq 45000 \quad \text{(formula 7)}$$

10. The pneumatic tire according to claim 1, wherein the cross-sectional width Wt (mm) is less than 205 mm.

11. The pneumatic tire according to claim 10, wherein the cross-sectional width Wt (mm) is less than 200 mm.

12. The pneumatic tire according to claim 1, wherein the thickness S (mm) of the sidewall in the tire width direction at the maximum width of the tire is 2.0 mm or less.

13. The pneumatic tire according to claim 12, wherein the thickness S (mm) of the sidewall in the tire width direction is 1.7 mm or less.

14. The pneumatic tire according to claim 1, which has an aspect ratio of 40% or more.

15. The pneumatic tire according to claim 14, which has an aspect ratio of 45% or more.

16. The pneumatic tire according to claim 15, which has an aspect ratio of 47.5% or more.

17. The pneumatic tire according to claim 16, which has an aspect ratio of 50% or more.

* * * * *